US012750835B2

(12) United States Patent
Lin

(10) Patent No.: US 12,750,835 B2
(45) Date of Patent: Sep. 29, 2026

(54) METHOD AND APPARATUS FOR BANDWIDTH PART PAIRING IN A WIRELESS COMMUNICATION SYSTEM

(71) Applicant: ASUS Technology Licensing Inc., Taipei City (TW)

(72) Inventor: Ko-Chiang Lin, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 411 days.

(21) Appl. No.: 18/196,566

(22) Filed: May 12, 2023

(65) Prior Publication Data

US 2023/0371015 A1 Nov. 16, 2023

Related U.S. Application Data

(60) Provisional application No. 63/341,473, filed on May 13, 2022.

(51) Int. Cl.

| | |
|---|---|
| ***H04W 72/0457*** | (2023.01) |
| ***H04L 5/14*** | (2006.01) |
| ***H04W 72/23*** | (2023.01) |

(52) U.S. Cl.

CPC ........... *H04W 72/0457* (2023.01); *H04L 5/14* (2013.01); *H04W 72/23* (2023.01)

(58) Field of Classification Search

CPC ............. H04W 72/0457; H04W 72/23; H04W 72/0453; H04W 16/10; H04W 28/20;

(Continued)

(56) References Cited

U.S. PATENT DOCUMENTS

| | | | | |
|---|---|---|---|---|
| 10,701,734 B2 * | 6/2020 | Shih | ...................... | H04W 24/10 |
| 10,813,137 B2 * | 10/2020 | Shih | .................. | H04W 74/0833 |

(Continued)

FOREIGN PATENT DOCUMENTS

| | | |
|---|---|---|
| CN | 112789935 A | 5/2021 |
| CN | 113841436 A | 12/2021 |
| WO | 2020233789 A1 | 11/2020 |

OTHER PUBLICATIONS

Office Action to the corresponding Korean patent application rendered by the Korean Intellectual Property Office (KIPO) on Jul. 8, 2025, 10 pages (including English translation).

(Continued)

*Primary Examiner* — John D Blanton

(74) *Attorney, Agent, or Firm* — Skaar Ulbrich Macari, P.A.

(57) ABSTRACT

Methods, systems, and apparatuses are provided for a UE in a wireless communication system to make Bandwidth Part (BWP) operation for duplexing enhancement more efficient. The method can comprise operating in unpaired spectrum, receiving configuration of one or more Downlink (DL) BWPs and configuration of one or more Uplink (UL) BWPs, wherein an active DL BWP among the one or more DL BWPs and an active UL BWP among the one or more UL BWPs have different center frequencies if the UE is indicated that different center frequencies for active UL BWP and active DL BWP are allowed, and receiving DL reception within the active DL BWP and transmitting UL transmission within the active UL BWP.

10 Claims, 11 Drawing Sheets

(58) Field of Classification Search
CPC ......... H04L 5/14; H04L 5/001; H04L 5/0044; H04L 5/0092
See application file for complete search history.

(56) References Cited

U.S. PATENT DOCUMENTS

| | | | | | |
|---|---|---|---|---|---|
| 11,064,434 | B2 * | 7/2021 | Lin | H04W 52/0225 | |
| 11,647,462 | B2 * | 5/2023 | Lin | H04W 52/0225 | 370/311 |
| 11,690,088 | B2 * | 6/2023 | Fakoorian | H04W 72/0453 | 370/329 |
| 11,889,537 | B2 * | 1/2024 | Zhang | H04W 72/0446 | |
| 12,342,338 | B2 * | 6/2025 | Seok | H04L 5/0053 | |
| 12,356,437 | B2 * | 7/2025 | Manolakos | H04W 72/044 | |
| 2019/0132793 | A1 * | 5/2019 | Lin | H04W 52/0206 | |
| 2019/0182870 | A1 * | 6/2019 | Shih | H04W 74/0833 | |
| 2019/0208548 | A1 * | 7/2019 | Shih | H04W 24/10 | |
| 2019/0289513 | A1 * | 9/2019 | Jeon | H04W 72/0453 | |
| 2020/0028659 | A1 * | 1/2020 | Huang | H04L 5/001 | |
| 2020/0053579 | A1 * | 2/2020 | Lu | H04W 52/242 | |
| 2020/0305168 | A1 * | 9/2020 | Liou | H04L 5/0098 | |
| 2021/0306117 | A1 * | 9/2021 | Salim | H04L 5/0053 | |
| 2021/0329677 | A1 * | 10/2021 | Huang | H04W 52/0206 | |
| 2021/0392531 | A1 * | 12/2021 | Lu | H04W 52/242 | |
| 2022/0022220 | A1 * | 1/2022 | Harada | H04B 7/088 | |
| 2022/0353867 | A1 * | 11/2022 | Zhang | H04W 72/0453 | |
| 2022/0394741 | A1 * | 12/2022 | Jiang | H04L 27/26025 | |
| 2023/0019320 | A1 * | 1/2023 | Huang | H04L 1/1861 | |
| 2023/0074775 | A1 * | 3/2023 | Lei | H04L 5/001 | |
| 2023/0079660 | A1 * | 3/2023 | Fu | H04L 5/0053 | 370/329 |
| 2023/0115192 | A1 * | 4/2023 | Nemeth | H04L 5/0053 | 370/329 |
| 2023/0143578 | A1 * | 5/2023 | Lin | H04L 5/0094 | 370/329 |
| 2023/0145355 | A1 * | 5/2023 | Lin | H04L 5/14 | 370/278 |
| 2023/0155798 | A1 * | 5/2023 | Abotabl | H04L 5/0092 | 370/329 |
| 2023/0163937 | A1 * | 5/2023 | Awadin | H04L 5/001 | 370/329 |
| 2023/0198667 | A1 * | 6/2023 | Abotabl | H04L 1/0073 | 714/726 |
| 2023/0247605 | A1 * | 8/2023 | Li | H04L 5/0035 | 370/329 |
| 2023/0284039 | A1 * | 9/2023 | Lin | H04W 16/28 | |
| 2023/0371015 | A1 * | 11/2023 | Lin | H04L 5/0044 | |
| 2024/0196413 | A1 * | 6/2024 | Chatterjee | H04L 5/0053 | |
| 2024/0243895 | A1 * | 7/2024 | Rastegardoost | H04W 72/51 | |
| 2024/0292398 | A1 * | 8/2024 | Feng | H04W 74/0833 | |
| 2024/0397498 | A1 * | 11/2024 | Kumagai | H04W 72/0453 | |
| 2024/0430048 | A1 * | 12/2024 | Manolakos | H04L 5/0094 | |
| 2025/0008500 | A1 * | 1/2025 | Manolakos | H04L 5/0051 | |
| 2025/0047454 | A1 * | 2/2025 | Jung | H04L 5/0094 | |
| 2025/0089035 | A1 * | 3/2025 | Lee | H04L 5/001 | |
| 2025/0184050 | A1 * | 6/2025 | Wang | H04W 72/23 | |

OTHER PUBLICATIONS

LG Electronics, R1-2204530, Study on Subband non-overlapping full duplex, 3GPP TSG RAN WG1 #109-E (Date of Publication on 3GPP server: Apr. 29, 2022), 6 pages.

Office Action to the corresponding Chinese patent application rendered by the China National Intellectual Property Administration (CNIPA) on May 15, 2026, 7 pages.

* cited by examiner

METHOD AND APPARATUS FOR BANDWIDTH PART PAIRING IN A WIRELESS COMMUNICATION SYSTEM

CROSS-REFERENCE TO RELATED APPLICATIONS

The present Application claims priority to and the benefit of U.S. Provisional Patent Application Ser. No. 63/341,473, filed May 13, 2022, which is fully incorporated herein by reference.

FIELD

This disclosure generally relates to wireless communication networks and, more particularly, to a method and apparatus for bandwidth part pairing in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for a UE in a wireless communication system to make Bandwidth Part (BWP) operation for duplexing enhancement more efficient. The method can comprise operating in unpaired spectrum, receiving configuration of one or more Downlink (DL) BWPs and configuration of one or more Uplink (UL) BWPs, wherein an active DL BWP among the one or more DL BWPs and an active UL BWP among the one or more UL BWPs have different center frequencies if the UE is indicated that different center frequencies for active UL BWP and active DL BWP are allowed, and receiving DL reception within the active DL BWP and transmitting UL transmission within the active UL BWP.

In various embodiments, a method for a UE in a wireless communication system can comprise operating in unpaired spectrum, being configured with one or more DL Resource Block (RB) sets and one or more UL RB sets on a symbol, performing an UL transmission on the symbol if a frequency resource of the UL transmission is within the one or more UL RB sets, and canceling the UL transmission on the symbol if the frequency resource of the UL transmission is not within the one or more UL RB sets.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP TS 38.211 V15.7.0, "NR physical channels and modulation"; [2] 3GPP TS 38.213 V16.6.0, "NR Physical layer procedures for control"; [3] 3GPP TS 38.321 V16.7.0, "NR MAC protocol specification"; and [4] RP-212707, "Draft SID on Evolution of NR Duplex Operation". The standards and documents listed above are hereby expressly and fully incorporated herein by reference in their entirety.

Figure 1:
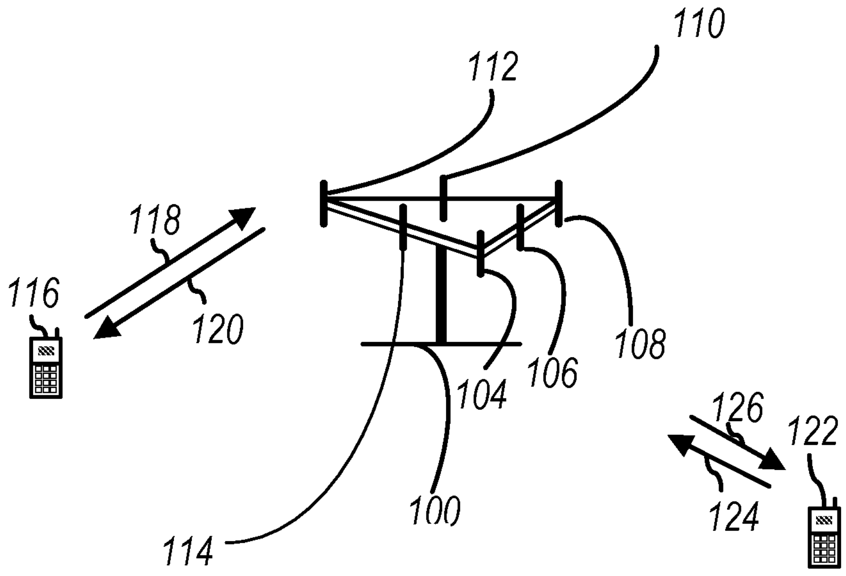
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
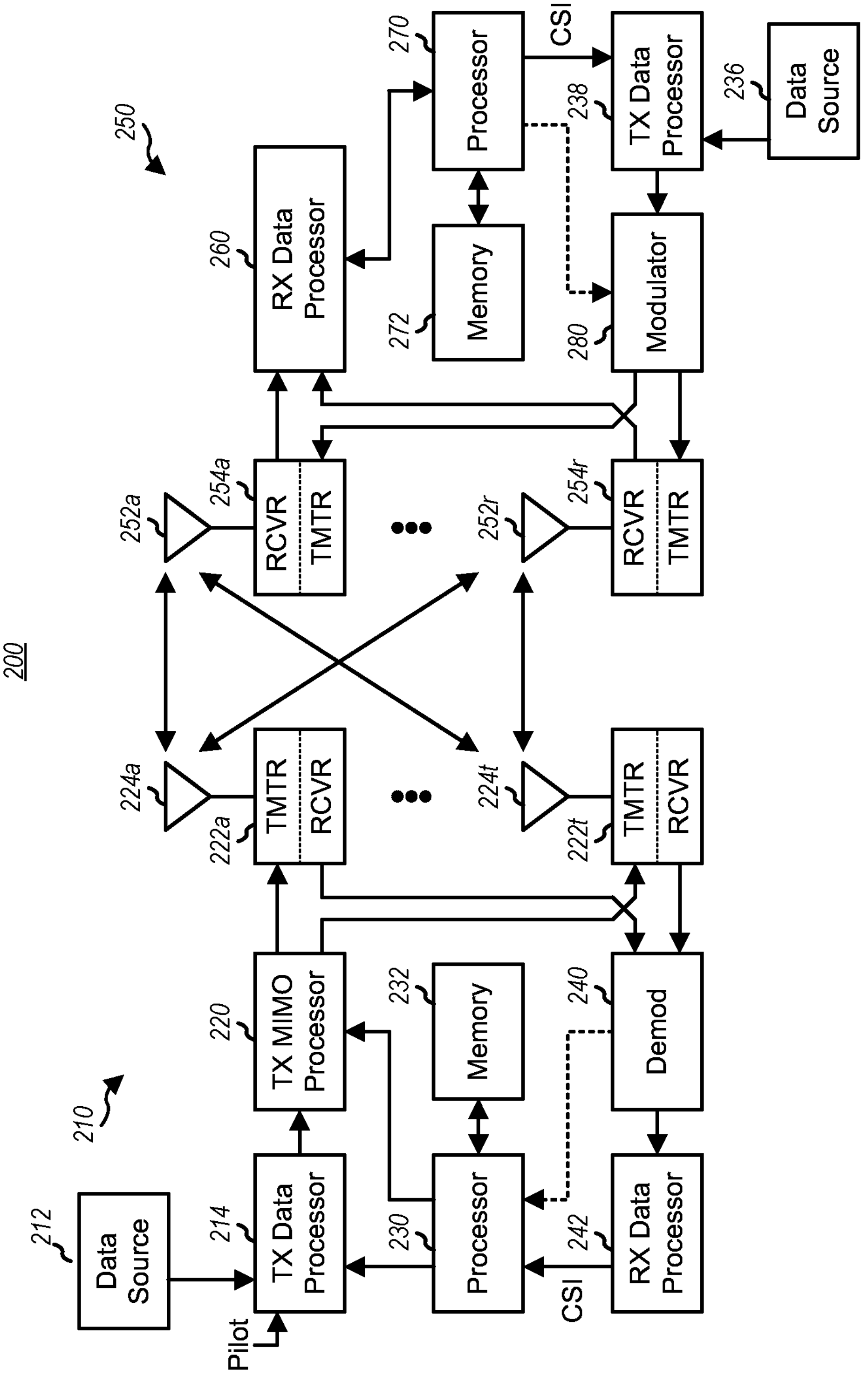
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250.

Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
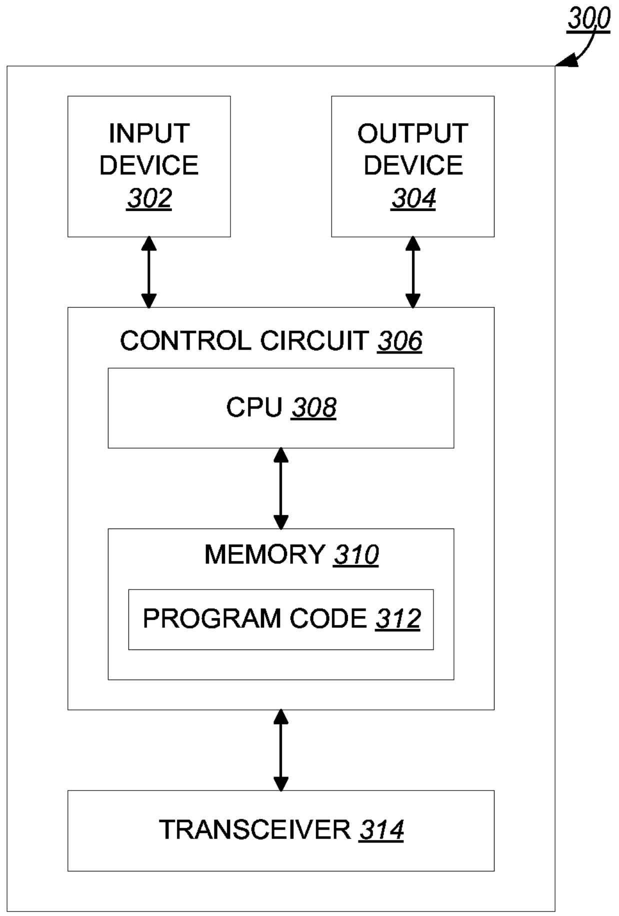
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
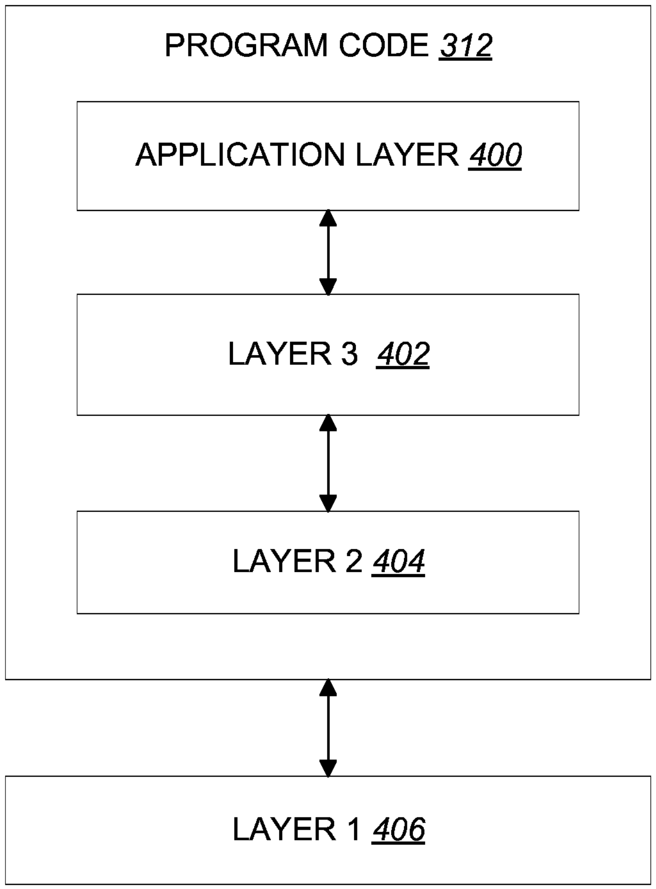
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

Frame structure used in New RAT (NR) for 5G, to accommodate various types of requirements (e.g., [1] 3GPP TS 38.211 V15.7.0, "NR physical channels and modulation") for time and frequency resource, e.g., from ultra-low latency (~0.5 ms) to delay-tolerant traffic for Machine Type Communication (MTC), from high peak rate for enhanced Mobile Broadband (eMBB) to very low data rate for MTC. An important focus of this study is low latency aspect, e.g., short Transmission Time Interval (TTI), while other aspects of mixing/adapting different TTIs can also be considered in the study. In addition to diverse services and requirements, forward compatibility is an important consideration in initial NR frame structure design as not all features of NR would be included in the beginning phase/release.

Reducing latency of protocol is an important improvement between different generations/releases, which can improve efficiency as well as meeting new application requirements, e.g., real-time service. An effective method frequently adopted to reduce latency is to reduce the length of TTIs, from 10 ms in 3G to 1 ms in LTE.

When it comes to NR, the story becomes somehow different, as backward compatibility is not a must. Numerology can be adjusted so that reducing symbol number of a TTI would not be the only tool to change TTI length. Using LTE numerology as an example, it comprises 14 Orthogonal Frequency Division Multiplexing (OFDM) symbols in 1 ms and a subcarrier spacing of 15 KHz. When the subcarrier spacing goes to 30 KHz, under the assumption of same Fast Fourier Transform (FFT) size and same Cyclic Prefix (CP) structure, there would be 28 OFDM symbols in 1 ms, equivalently the TTI become 0.5 ms if the number of OFDM symbols in a TTI is kept the same. This implies the design between different TTI lengths can be kept common, with good scalability performed on the subcarrier spacing. Of course, there would always be trade-offs for the subcarrier spacing selection, e.g., FFT size, definition/number of Physical Resource Block (PRB), the design of CP, supportable system bandwidth, etc. While as NR considers larger system bandwidth, and larger coherence bandwidth, inclusion of a larger sub carrier spacing is a natural choice.

More details of NR frame structure, channel, and numerology design is given below from [1] 3GPP TS 38.211 V15.7.0, "NR physical channels and modulation":

*******************************Quotation Start***************************************

4 Frame Structure and Physical Resources 4.1 General

Throughout this specification, unless otherwise noted, the size of various fields in the time domain is expressed in time units $T_c=1/(\Delta f_{max}\cdot N_f)$ where $\Delta f_{max}=480\cdot 10^3$ Hz and $N_f=4096$. The constant $\kappa=T_s/T_c=64$ where $T_s=1/(\Delta f_{ref}\cdot N_{f,ref})$, $\Delta f_{ref}=15\cdot 10^3$ Hz and $N_{f,ref}=2048$.

4.2 Numerologies

Multiple OFDM numerologies are supported as given by Table 4.2-1 where μ and the cyclic prefix for a bandwidth part are obtained from the higher-layer parameter subcarrierSpacing and cyclicPrefix, respectively.

TABLE 4.2-1

Supported transmission numerologies.

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

4.3 Frame Structure 4.3.1 Frames and Subframes

Downlink and uplink transmissions are organized into frames with $T_f=(\Delta f_{max}N_f/100)\cdot T_c=10$ ms duration, each consisting of ten subframes of $T_{sf}=(\Delta f_{max}N_f/1000)\cdot T_c=1$ ms duration. The number of consecutive OFDM symbols per subframe is $$N_{symb}^{subframe,\mu}=N_{symb}^{slot}N_{slot}^{subframe,\mu}.$$

Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier.

Uplink frame number i for transmission from the UE shall start $T_{TA}=(N_{TA}+N_{TA,offset})T_c$ before the start of the corresponding downlink frame at the UE where $N_{TAoffset}$ is given by [5, TS 38.213].

Figure 5:
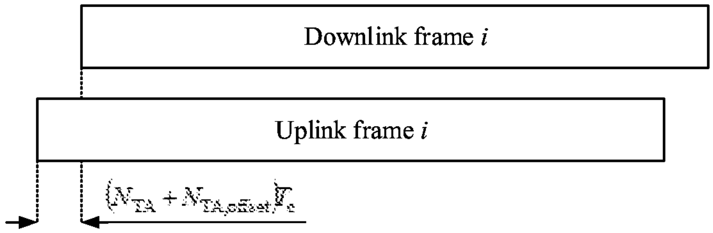
FIG. 5 (PRIOR ART)
FIG. 5 is a reproduction of FIG. 4.3.1-1: Uplink-downlink timing relation, from 3GPP TS 38.211 V15.7.0, "NR physical channels and modulation".

FIG. 5 is a reproduction of FIG. 4.3.1-1: Uplink-downlink timing relation, from 3GPP TS 38.211 V15.7.0, "NR physical channels and modulation".

4.3.2 Slots

For subcarrier spacing configuration μ, slots are numbered $$n_s^{\mu}\in\{0, \ldots , N_{slot}^{subframe,\mu}-1\}$$

in increasing order within a subframe and $$n_{s,f}^{\mu}\in\{0, \ldots , N_{slot}^{frame,\mu}-1\}$$

in increasing order within a frame. There are $$N_{symb}^{slot}$$

consecutive OFDM symbols in a slot where $$N_{symb}^{slot}$$

depends on the cyclic prefix as given by Tables 4.3.2-1 and 4.3.2-2. The start of slot $$n_s^{\mu}N_{symb}^{slot}$$

in a subframe is aligned in time with the start of OFDM symbol $$n_s^{\mu}$$

in the same subframe.

OFDM symbols in a slot can be classified as 'downlink', 'flexible', or 'uplink'. Signaling of slot formats is described in subclause 11.1 of [5, TS 38.213].

In a slot in a downlink frame, the UE shall assume that downlink transmissions only occur in 'downlink' or 'flexible' symbols.

In a slot in an uplink frame, the UE shall only transmit in 'uplink' or 'flexible' symbols.

A UE not capable of full-duplex communication and not supporting simultaneous transmission and reception as defined by paremeter simultaneousRxTxInterBandENDC, simultaneousRxTxInterBandCA or simultaneousRxTxSUL [10, TS 38.306] among all cells within a group of cells is not expected to transmit in the uplink in one cell within the group of cells earlier than $N_{Rx-Tx}T_c$ after the end of the last received downlink symbol in the same or different cell within the group of cells where $N_{Rx-Tx}$ is given by Table 4.3.2-3.

A UE not capable of full-duplex communication and not supporting simultaneous transmission and reception as defined by parameter simultaneousRxTxInterBandENDC, simultaneousRxTxInterBandCA or simultaneousRxTxSUL [10, TS 38.306] among all cells within a group of cells is not expected to receive in the downlink in one cell within the group of cells earlier than $N_{Rx-Tx}T_c$ after the end of the last transmitted uplink symbol in the same or different cell within the group of cells where $N_{Rx-Tx}$ is given by Table 4.3.2-3.

A UE not capable of full-duplex communication is not expected to transmit in the uplink earlier than $N_{Rx-Tx}T_c$ after the end of the last received downlink symbol in the same cell where $N_{Rx-Tx}$ is given by Table 4.3.2-3.

A UE not capable of full-duplex communication is not expected to receive in the downlink earlier than $N_{Rx-Tx}T_c$ after the end of the last transmitted uplink symbol in the same cell where $N_{Rx-Tx}$ is given by Table 4.3.2-3.

TABLE 4.3.2-1

Number of OFDM symbols per slot, slots per frame, and slots per subframe for normal cyclic prefix.

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4.3.2-2

Number of OFDM symbols per slot, slots per frame, and slots per subframe for extended cyclic prefix.

| μ | $N_{symb}^{slot}$ | $N_{slot}^{frame,\mu}$ | $N_{slot}^{subframe,\mu}$ |
|---|---|---|---|
| 2 | 12 | 40 | 4 |

TABLE 4.3.2-3

Transition time $N_{Rx-Tx}$ and $N_{Tx-Rx}$

| Transition time | FR1 | FR2 |
|---|---|---|
| $N_{Tx-Rx}$ | 25600 | 13792 |
| $N_{Rx-Tx}$ | 25600 | 13792 |

4.4 Physical Resources

4.4.1 Antenna Ports

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG as described in clause 5.1.2.3 of [6, TS 38.214].

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used as described in clause 7.3.2.2.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index according to clause 7.4.3.1.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

4.4.2 Resource Grid

For each numerology and carrier, a resource grid of $$N_{grid,x}^{size,\mu} N_{sc}^{RB}$$

subcarriers and $$N_{symb}^{subframe,\mu}$$

OFDM symbols is defined, starting at common resource block $$N_{grid}^{start,\mu}$$

indicated by higher-layer signalling. There is one set of resource grids per transmission direction (uplink or downlink) with the subscript x set to DL and UL for downlink and uplink, respectively. When there is no risk for confusion, the subscript x may be dropped. There is one resource grid for a given antenna port p, subcarrier spacing configuration μ, and transmission direction (downlink or uplink).

The carrier bandwidth $$N_{grid}^{size,\mu}$$

for subcarrier spacing configuration μ is given by the higher-layer parameter carrierBandwidth in the SCS-SpecificCarrier IE. The starting position $$N_{grid}^{start,\mu}$$

for subcarrier spacing configuration μ is given by the higher-layer parameter offsetToCarrier in the SCS-SpecificCarrier IE.

The frequency location of a subcarrier refers to the center frequency of that subcarrier.

For the downlink, the higher-layer parameter txDirectCurrentLocation in the SCS-Specific Carrier IE indicates the location of the transmitter DC subcarrier in the downlink for each of the numerologies configured in the downlink. Values in the range 0-3299 represent the number of the DC subcarrier and the value 3300 indicates that the DC subcarrier is located outside the resource grid.

For the uplink, the higher-layer parameter txDirectCurrentLocation in the UplinkTxDirectCurrentBWP IE indicates the location of the transmitter DC subcarrier in the uplink for each of the configured bandwidth parts, including whether the DC subcarrier location is offset by 7.5 kHz relative to the center of the indicated subcarrier or not. Values in the range 0-3299 represent the number of the DC subcarrier, the value 3300 indicates that the DC subcarrier is located outside the resource grid, and the value 3301 indicates that the position of the DC subcarrier in the uplink is undetermined.

4.4.3 Resource Elements

Each element in the resource grid for antenna port p and subcarrier spacing configuration μ is called a resource element and is uniquely identified by $(k,l)_{p,\mu}$ where k is the index in the frequency domain and l refers to the symbol position in the time domain relative to some reference point. Resource element $(k,l)_{p,\mu}$ corresponds to a physical resource and the complex value $$a_{k,l}^{(p,\mu)}.$$

When there is no risk for confusion, or no particular antenna port or subcarrier spacing is specified, the indices p and μ may be dropped, resulting in $$a_{k,l}^{(p)}$$

or $a_{k,l}$.

4.4.4 Resource Blocks

4.4.4.1 General

A resource block is defined as $$N_{sc}^{RB} = 12$$

consecutive subcarriers in the frequency domain.

4.4.4.2 Point A

Point A serves as a common reference point for resource block grids and is obtained from:

offsetToPointA for a PCell downlink where offsetToPointA represents the frequency offset between point A and the lowest subcarrier of the lowest resource block, which has the subcarrier spacing provided by the higher-layer parameter subCarrierSpacingCommon and overlaps with the SS/PBCH block used by the UE for initial cell selection, expressed in units of resource blocks assuming 15 kHz subcarrier spacing for FR1 and 60 kHz subcarrier spacing for FR2;

absoluteFrequencyPointA for all other cases where absoluteFrequencyPointA represents the frequency-location of point A expressed as in ARFCN.

4.4.4.3 Common Resource Blocks

Common resource blocks are numbered from 0 and upwards in the frequency domain for subcarrier spacing configuration μ. The center of subcarrier 0 of common resource block 0 for subcarrier spacing configuration μ coincides with 'point A'.

The relation between the common resource block number $$n_{CRB}^{\mu}$$

in the frequency domain and resource elements (k,l) for subcarrier spacing configuration μ is given by $$n_{CRB}^{\mu} = \left\lfloor \frac{k}{N_{sc}^{RB}} \right\rfloor$$

where k is defined relative to point A such that k=0 corresponds to the subcarrier centered around point A.

4.4.4.4 Physical Resource Blocks

Physical resource blocks for subcarrier configuration μ are defined within a bandwidth part and numbered from 0 to $$N_{BWP,i}^{size,\mu} - 1$$

where i is the number of the bandwidth part. The relation between the physical resource block $$n_{PRB}^{\mu}$$

in bandwidth part i and the common resource block $$n_{CRB}^{\mu}$$

is given by $$n_{CRB}^{\mu} = n_{PRB}^{\mu} + N_{BWP,i}^{start,\mu}$$

where $$N_{BWP,i}^{start,\mu}$$

is the common resource block where bandwidth part starts relative to common resource block 0. When there is no risk for confusion the index μ may be dropped.

4.4.4.5 Virtual Resource Blocks

Virtual resource blocks are defined within a bandwidth part and numbered from 0 to $$N_{BWP,i}^{size} - 1$$

where i is the number of the bandwidth part.

4.4.5 Bandwidth Part

A bandwidth part is a subset of contiguous common resource blocks defined in subclause 4.4.4.3 for a given numerology $\mu_i$ in bandwidth part i on a given carrier. The starting position $$N_{BWP,i}^{start,\mu}$$

and the number of resource blocks $$N_{BWP,i}^{size,\mu}$$

in a bandwidth part shall fulfil $$N_{grid,x}^{start,\mu} \le N_{BWP,i}^{start,\mu} < N_{grid,x}^{start,\mu} + N_{grid,x}^{size,\mu} \text{ and } N_{grid,x}^{start,\mu} < N_{grid,x}^{start,\mu} + N_{BWP,i}^{size,\mu} \le N_{grid,x}^{start,\mu} + N_{grid,x}^{size,\mu},$$

respectively. Configuration of a bandwidth part is described in clause 12 of [5, TS 38.213].

A UE can be configured with up to four bandwidth parts in the downlink with a single downlink bandwidth part being active at a given time. The UE is not expected to receive PDSCH, PDCCH, or CSI-RS (except for RRM) outside an active bandwidth part.

A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part.

Unless otherwise noted, the description in this specification applies to each of the bandwidth parts. When there is no risk of confusion, the index μ may be dropped from $$N_{BWP,i}^{start,\mu},\ N_{BWP,i}^{size,\mu},\ N_{grid,x}^{start,\mu}, \text{ and } N_{grid,x}^{size,\mu}.$$

4.5 Carrier Aggregation

Transmissions in multiple cells can be aggregated. Unless otherwise noted, the description in this specification applies to each of the serving cells.

**********************************Quotation-End*******************************************

Slot format information (SFI) is introduced to indicate transmission direction for a symbol(s), e.g., DL, UL or Flexible. SFI could be indicated or revealed by several signals, such as RRC configuration, DCI for SFI, scheduling DCI. Some handling would be then required if more than one direction is indicated to a symbol. More details regarding SFI is quoted below from [2] 3GPP TS 38.213 V16.6.0, "NR Physical layer procedures for control":

**********************************Quotation Start*****************************************

11.1 Slot Configuration

A slot format includes downlink symbols, uplink symbols, and flexible symbols.

The following are applicable for each serving cell.

If a UE is provided tdd-UL-DL-ConfigurationCommon, the UE sets the slot format per slot over a number of slots as indicated by tdd-UL-DL-ConfigurationCommon.

The tdd-UL-DL-ConfigurationCommon provides a reference SCS configuration $\mu_{ref}$ by referenceSubcarrierSpacing a pattern1.

The pattern1 provides a slot configuration period of P msec by dl-UL-TransmissionPeriodicity a number of slots $d_{slots}$ with only downlink symbols by nrofDownlinkSlots a number of downlink symbols $d_{sym}$ by nrofDownlinkSymbols a number of slots $u_{slots}$ with only uplink symbols by nrofUplinkSlots a number of uplink symbols $u_{sym}$ by nrofUplinkSymbols A value P=0.625 msec is valid only for $\mu_{ref}=3$. A value P=1.25 msec is valid only for $\mu_{ref}=2$ or $\mu_{ref}=3$. A value P=2.5 msec is valid only for $\mu_{ref}=1$, or $\mu_{ref}=2$, or $\mu_{ref}=3$.

A slot configuration period of P msec includes $S=P\cdot 2^{\mu_{ref}}$ slots with SCS configuration $\mu_{ref}$. From the S slots, a first $d_{slots}$ slots include only downlink symbols and a last $u_{slots}$ slots include only uplink symbols. The $d_{sym}$ symbols after the first $d_{slots}$ slots are downlink symbols. The $u_{sym}$ symbols before the last $u_{slots}$ slots are uplink symbols. The remaining $$(S - d_{slots} - u_{slots}) \cdot N_{symb}^{slot} - d_{sym} - u_{sym}$$

are flexible symbols.

The first symbol every 20/P periods is a first symbol in an even frame.

If tdd-UL-DL-ConfigurationCommon provides both pattern1 and pattern2, the UE sets the slot format per slot over a first number of slots as indicated by pattern1 and the UE sets the slot format per slot over a second number of slots as indicated by pattern2.

The pattern2 provides a slot configuration period of $P_2$ msec by dl-UL-TransmissionPeriodicity a number of slots $d_{slots,2}$ with only downlink symbols by nrofDownlinkSlots a number of downlink symbols $d_{sym,2}$ by nrofDownlinkSymbols a number of slots $u_{slots,2}$ with only uplink symbols by nrofUplinkSlots a number of uplink symbols $u_{sym,2}$ by nrofUplinkSymbols The applicable values of $P_2$ are same as the applicable values for P.

A slot configuration period of $P+P_2$ msec includes first $S=P\cdot 2^{\mu_{ref}}$ slots and second $S_2=P_2\cdot 2^{\mu_{ref}}$ slots.

From the $S_2$ slots, a first $d_{slots,2}$ slots include only downlink symbols and a last $u_{slots,2}$ include only uplink symbols.

The $d_{sym,2}$ symbols after the first $d_{slots,2}$ slots are downlink symbols. The $u_{sym,2}$ symbols before the last $u_{slots,2}$ slots are uplink symbols. The remaining $$(S_2 - d_{slots,2} -_{slots,2}) \cdot N_{symb}^{slot} - d_{symn,2} - u_{sym,2}$$

are flexible symbols.

A UE expects that $P+P_2$ divides 20 msec.

The first symbol every $20/(P+P_2)$ periods is a first symbol in an even frame.

A UE expects that the reference SCS configuration $\mu_{ref}$ is smaller than or equal to a SCS configuration $\mu$ for any configured DL BWP or UL BWP. Each slot provided by pattern1 or pattern2 is applicable to $2^{(\mu-\mu_{ref})}$ consecutive slots in the active DL BWP or the active UL BWP where the first slot starts at a same time as a first slot for the reference SCS configuration $\mu_{ref}$ and each downlink or flexible or uplink symbol for the reference SCS configuration $\mu_{ref}$ corresponds to $2^{(\mu-\mu_{ref})}$ consecutive downlink or flexible or uplink symbols for the SCS configuration $\mu$.

If the UE is additionally provided tdd-UL-DL-ConfigurationDedicated, the parameter tdd-UL-DL-ConfigurationDedicated overrides only flexible symbols per slot over the number of slots as provided by tdd-UL-DL-ConfigurationCommon.

The tdd-UL-DL-ConfigurationDedicated provides a set of slot configurations by slotSpecificConfigurationsToAddModList for each slot configuration from the set of slot configurations a slot index for a slot provided by slotIndex a set of symbols for a slot by symbols where if symbols=allDownlink, all symbols in the slot are downlink if symbols=allUplink, all symbols in the slot are uplink if symbols=explicit, nrofDownlinkSymbols provides a number of downlink first symbols in the slot and nrofUplinkSymbols provides a number of uplink last symbols in the slot. If nrofDownlinkSymbols is not provided, there are no downlink first symbols in the slot and if nrofUplinkSymbols is not provided, there are no uplink last symbols in the slot. The remaining symbols in the slot are flexible For each slot having a corresponding index provided by slotIndex, the UE applies a format provided by a corresponding symbols. The UE does not expect tdd-UL-DL-ConfigurationDedicated to indicate as uplink or as downlink a symbol that tdd-UL-DL-ConfigurationCommon indicates as a downlink or as an uplink symbol, respectively.

For each slot configuration provided by tdd-UL-DL-ConfigurationDedicated, a reference SCS configuration is the reference SCS configuration $\mu_{ref}$ provided by tdd-UL-DL-ConfigurationCommon.

A slot configuration period and a number of downlink symbols, uplink symbols, and flexible symbols in each slot of the slot configuration period are determined from tdd-UL-DL-ConfigurationCommon and tdd-UL-DL-ConfigurationDedicated and are common to each configured BWP.

A UE considers symbols in a slot indicated as downlink by tdd-UL-DL-ConfigurationCommon, or tdd-UL-DL-ConfigurationDedicated to be available for receptions and considers symbols in a slot indicated as uplink by tdd-UL-DL-ConfigurationCommon, or by tdd-UL-DL-ConfigurationDedicated to be available for transmissions.

If a UE is not configured to monitor PDCCH for DCI format 2_0, for a set of symbols of a slot that are indicated as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE

- the UE receives PDSCH or CSI-RS in the set of symbols of the slot if the UE receives a corresponding indication by a DCI format
- the UE transmits PUSCH, PUCCH, PRACH, or SRS in the set of symbols of the slot if the UE receives a corresponding indication by a DCI format, a RAR UL grant, fallbackRAR UL grant, or successRAR For operation on a single carrier in unpaired spectrum, if a UE is configured by higher layers to receive a PDCCH, or a PDSCH, or a CSI-RS, or a DL PRS in a set of symbols of a slot, the UE receives the PDCCH, the PDSCH, the CSI-RS, or the DL PRS if the UE does not detect a DCI format that indicates to the UE to transmit a PUSCH, a PUCCH, a PRACH, or a SRS in at least one symbol of the set of symbols of the slot; otherwise, the UE does not receive the PDCCH, or the PDSCH, or the CSI-RS, or the DL PRS in the set of symbols of the slot.

For operation with shared spectrum channel access, if a UE is provided csi-RS-ValidationWith-DCI, is not provided CO-DurationsPerCell, and is not provided SlotFormatCombinationsPerCell, and if the UE is configured by higher layers to receive a CSI-RS in a set of symbols of a slot, the UE cancels the CSI-RS reception in the set of symbols of the slot if the UE does not detect a DCI format indicating an aperiodic CSI-RS reception or scheduling a PDSCH reception in the set of symbols of the slot.

If a UE is provided channelAccessMode='dynamic' and is provided availableRB-SetsToAddModList and availableRB-SetsToRelease, the UE expects to be provided co-DurationsPerCellToAddModList and co-DurationsPerCellToReleaseList and/or slotFormatCombToAddModList and slotFormatCombToReleaseList.

For operation on a single carrier in unpaired spectrum, if a UE is configured by higher layers to transmit SRS, or PUCCH, or PUSCH, or PRACH in a set of symbols of a slot and the UE detects a DCI format indicating to the UE to receive CSI-RS or PDSCH in a subset of symbols from the set of symbols, then

- If the UE does not indicate the capability of [partialCancellation], the UE does not expect to cancel the transmission of the PUCCH or PUSCH or PRACH in the set of symbols if the first symbol in the set occurs within $T_{proc,2}$ relative to a last symbol of a CORESET where the UE detects the DCI format; otherwise, the UE cancels the PUCCH, or the PUSCH, or an actual repetition of the PUSCH [6, TS38.214], determined from clauses 9 and 9.2.5 or clause 6.1 of [6, TS38.214], or the PRACH transmission in the set of symbols.
- If the UE indicates the capability of [partialCancellation], the UE does not expect to cancel the transmission of the PUCCH or PUSCH or PRACH in symbols from the set of symbols that occur within $T_{proc,2}$ relative to a last symbol of a CORESET where the UE detects the DCI format. The UE cancels the PUCCH, or the PUSCH, or an actual repetition of the PUSCH [6, TS 38.214], determined from clauses 9 and 9.2.5 or clause 6.1 of [6, TS 38.214], or the PRACH transmission in remaining symbols from the set of symbols.
- The UE does not expect to cancel the transmission of SRS in symbols from the subset of symbols that occur within $T_{proc,2}$ relative to a last symbol of a CORESET where the UE detects the DCI format. The UE cancels the SRS transmission in remaining symbols from the subset of symbols.

$T_{proc,2}$ is the PUSCH preparation time for the corresponding UE processing capability [6, TS 38.214] assuming $d_{2,1}=1$ and $\mu$ corresponds to the smallest SCS configuration between the SCS configuration of the PDCCH carrying the DCI format and the SCS configuration of the SRS, PUCCH, PUSCH or $\mu_r$, where $\mu_r$ corresponds to the SCS configuration of the PRACH if it is 15 kHz or higher; otherwise $\mu_r=0$.

For a set of symbols of a slot that are indicated to a UE as uplink by tdd-UL-DL-ConfigurationCommon, or tdd-UL-DL-ConfigurationDedicated, the UE does not receive PDCCH, PDSCH, or CSI-RS when the PDCCH, PDSCH, or CSI-RS overlaps, even partially, with the set of symbols of the slot.

For a set of symbols of a slot that are indicated to a UE as uplink by tdd-UL-DL-ConfigurationCommon, or tdd-UL-DL-ConfigurationDedicated, the UE does not receive DL PRS in the set of symbols of the slot, if the UE is not provided with a measurement gap.

For a set of symbols of a slot that are indicated to a UE as downlink by tdd-UL-DL-ConfigurationCommon, or tdd-UL-DL-ConfigurationDedicated, the UE does not transmit PUSCH, PUCCH, PRACH, or SRS when the PUSCH, PUCCH, PRACH, or SRS overlaps, even partially, with the set of symbols of the slot.

For a set of symbols of a slot that are indicated to a UE as flexible by tdd-UL-DL-ConfigurationCommon, and tdd-UL-DL-ConfigurationDedicated if provided, the UE does not expect to receive both dedicated higher layer parameters configuring transmission from the UE in the set of symbols of the slot and dedicated higher layer parameters configuring reception by the UE in the set of symbols of the slot.

For operation on a single carrier in unpaired spectrum, for a set of symbols of a slot indicated to a UE by ssb-PositionsInBurst in SIB1 or ssb-PositionsInBurst in ServingCellConfigCommon, for reception of SS/PBCH blocks, the UE does not transmit PUSCH, PUCCH, PRACH in the slot if a transmission would overlap with any symbol from the set of symbols and the UE does not transmit SRS in the set of symbols of the slot. The UE does not expect the set of symbols of the slot to be indicated as uplink by tdd-UL-DL-ConfigurationCommon, or tdd-UL-DL-ConfigurationDedicated, when provided to the UE.

If a UE

- is configured with multiple serving cells and is provided with directionalCollisionHandling-r16='enabled' for a set of serving cell(s) among the multiple serving cells, and
- indicates support of half-DuplexTDD-CA-SameSCS-r16 capability, and
- is not configured to monitor PDCCH for detection of DCI format 2_0 on any of the multiple serving cells, for a set of symbols of a slot that are indicated to the UE for reception of SS/PBCH blocks in a first cell of the multiple serving cells by ssb-PositionsInBurst in SystemInformationBlockType1 or by ssb-PositionsInBurst in ServingCellConfigCommon, when provided to the UE, the UE does not transmit PUSCH, PUCCH, or PRACH in the slot if a transmission would overlap with any symbol from the set of symbols, and the UE does not transmit SRS in the set of symbols of the slot in

- any of the multiple serving cells if the UE is not capable of simultaneous transmission and reception as indicated by simultaneousRxTxInterBandCA among the multiple serving cells, and
- any one of the cells corresponding to the same band as the first cell, irrespective of any capability indicated by simultaneousRxTxInterBandCA.

For a set of symbols of a slot corresponding to a valid PRACH occasion and $N_{gap}$ symbols before the valid PRACH occasion, as described in clause 8.1, the UE does not receive PDCCH, PDSCH, or CSI-RS in the slot if a reception would overlap with any symbol from the set of symbols. The UE does not expect the set of symbols of the slot to be indicated as downlink by tdd-UL-DL-ConfigurationCommon or tdd-UL-DL-ConfigurationDedicated.

For a set of symbols of a slot indicated to a UE by pdcch-ConfigSIB1 in MIB for a CORESET for Type0-PDCCH CSS set, the UE does not expect the set of symbols to be indicated as uplink by tdd-UL-DL-ConfigurationCommon, or tdd-UL-DL-ConfigurationDedicated.

If a UE is scheduled by a DCI format to receive PDSCH over multiple slots, and if tdd-UL-DL-ConfigurationCommon, or tdd-UL-DL-ConfigurationDedicated, indicate that, for a slot from the multiple slots, at least one symbol from a set of symbols where the UE is scheduled PDSCH reception in the slot is an uplink symbol, the UE does not receive the PDSCH in the slot.

If a UE is scheduled by a DCI format to transmit PUSCH over multiple slots, and if tdd-UL-DL-ConfigurationCommon, or tdd-UL-DL-ConfigurationDedicated, indicates that, for a slot from the multiple slots, at least one symbol from a set of symbols where the UE is scheduled PUSCH transmission in the slot is a downlink symbol, the UE does not transmit the PUSCH in the slot.

If a UE

- is configured with multiple serving cells and is provided with directionalCollisionHandling-r16='enabled' for a set of serving cell(s) among the configured multiple serving cells, and
- indicates support of half-DuplexTDD-CA-SameSCS-r16 capability, and
- is not configured to monitor PDCCH for detection of DCI format 2_0 on any of the multiple serving cells, the UE determines a reference cell for a symbol as an active cell with the smallest cell index among

- the configured multiple serving cells if the UE is not capable of simultaneous transmission and reception as indicated by simultaneousRxTxInterBandCA among the multiple serving cells, and
- the cells of each band respectively if the UE is capable of simultaneous transmission and reception by simultaneousRxTxInterBandCA for the configured multiple serving cells, where the symbol is configured as

- downlink, or uplink, as indicated by tdd-UL-DL-ConfigurationCommon or tdd-UL-DL-ConfigurationDedicated
- uplink, if the symbol is flexible and the UE is configured to transmit SRS, PUCCH, PUSCH, or PRACH on the symbol
- downlink, if the symbol is flexible and the UE is configured to receive PDCCH, PDSCH or CSI-RS on the symbol.

And if another cell among the cells configured with directionalCollisionHandling-r16 operates in the same frequency band as the reference cell, the UE does not expect

- a symbol to be indicated as downlink or uplink on the reference cell and as uplink or downlink on another cell, respectively, by tdd-UL-DL-ConfigurationCommon or by tdd-UL-DL-ConfigurationDedicated,
- tdd-UL-DL-ConfigurationCommon or tdd-UL-DL-ConfigDedicated to indicate a symbol as downlink on the reference cell and to detect a DCI format scheduling a transmission on the symbol on another cell, and
- to be configured by higher layers to receive PDCCH, PDSCH, or CSI-RS on a flexible symbol on the reference cell and to detect a DCI format scheduling a transmission on the symbol on another cell, if the reference cell and another cell among the cells configured with directionalCollisionHandling-r16 operate in different frequency bands, ps the UE

- assumes symbol as flexible, is not required to receive higher layer configured PDCCH, PDSCH, or CSI-RS and not expected to transmit higher layer configured SRS, PUCCH, PUSCH, or PRACH, when tdd-UL-DL-ConfigurationCommon or tdd-UL-DL-ConfigurationDedicated indicates symbol as downlink or uplink on another cell and as uplink or downlink for the reference cell, respectively,
- transmits a signal/channel scheduled by a DCI format on a symbol of another cell when the symbol is indicated as downlink by tdd-UL-DL-ConfigurationCommon or tdd-UL-DL-ConfigDedicated for the reference cell,
- is not required to receive a higher layer configured PDCCH, PDSCH, or CSI-RS on flexible symbols on the reference cell in a set of symbols, if the UE detects a DCI format scheduling a transmission on one or more symbols in the set of symbols on another cell, and regardless of whether the reference cell and another cell operate in same or different frequency bands, the UE
- does not expect tdd-UL-DL-ConfigurationCommon or tdd-UL-DL-ConfigurationDedicated for the reference cell to indicate a symbol as uplink and to detect a DCI format scheduling a reception on the symbol on another cell
- does not expect to be configured by higher layers to transmit SRS, PUCCH, PUSCH, or PRACH on a flexible symbol on the reference cell and to detect a DCI format scheduling a reception on the symbol on another cell
- does not transmit a PUCCH, PUSCH or PRACH that is configured by higher layers on a set of symbols on another cell if at least one symbol from the set of symbols is indicated as downlink by tdd-UL-DL-ConfigurationCommon or tdd-UL-DL-ConfigurationDedicated or is a symbol corresponding to a PDCCH, PDSCH, or CSI-RS reception that is configured by higher layers on the reference cell
- does not transmit a SRS that is configured by higher layers on a set of symbols on another cell if the set of symbols is indicated as downlink by tdd-UL-DL-Configuration-Common or tdd-UL-DL-ConfigurationDedicated or corresponds to a PDCCH, PDSCH or CSI-RS reception that is configured by higher layers on the reference cell
- does not receive a PDCCH, PDSCH or CSI-RS that is configured by higher layers on a set of symbols on another cell if at least one symbol from the set of symbols is indicated as uplink by tdd-UL-DL-ConfigurationCommon or tdd-UL-DL-ConfigurationDedicated or is a symbol corresponding to a SRS, PUCCH, PUSCH, or PRACH transmission that is configured by higher layers on the reference cell assumes a symbol indicated as downlink or uplink by tdd-UL-DL-ConfigurationCommon or tdd-UL-DL-ConfigurationDedicated on another cell to be flexible, if the UE is respectively configured by higher layers to transmit SRS, PUCCH, PUSCH, or PRACH or to receive PDCCH, PDSCH, or CSI-RS on the reference cell does not expect to detect a first DCI format scheduling a transmission or reception on a symbol on a first cell and a second DCI format scheduling a reception or transmission on the symbol on a second cell, respectively.

After the UE applies the procedures described above for directional collision handling within the set of cells that have been configured with directionalCollisionHandling-r16, the UE does not expect any directional collision among the serving cells that the UE is not capable of simultaneous transmission and reception.

11.1.1 UE Procedure for Determining Slot Format

This clause applies for a serving cell that is included in a set of serving cells configured to a UE by slotFormatCombToAddModList and slotFormatCombToReleaseList, availableRB-SetsToAddModList and availableRB-SetsToRelease, switchTriggerToAddModList and switchTriggerToReleaseList, or co-DurationsPerCellToAddModList and co-DurationsPerCellToReleaseList.

If a UE is configured by higher layers with parameter SlotFormatIndicator, the UE is provided an SFI-RNTI by sfi-RNTI and with a payload size of DCI format 2_0 by dci-PayloadSize.

The UE is also provided in one or more serving cells with a configuration for a search space set s and a corresponding CORESET p for monitoring $$M_{p,s}^{(L_{SFI})}$$

PDCCH candidates for DCI format 2_0 with a CCE aggregation level of $L_{SFI}$ CCEs as described in clause 10.1. The $$M_{p,s}^{(L_{SFI})}$$

PDCCH candidates are the first $$M_{p,s}^{(L_{SFI})}$$

PDCCH candidates for CCE aggregation level $L_{SFI}$ for search space set s in CORESET p.

For each serving cell in the set of serving cells, the UE can be provided:

an identity of the serving cell by servingCellId a location of a SFI-index field in DCI format 2_0 by positionInDCI a set of slot format combinations by slotFormatCombinations, where each slot format combination in the set of slot format combinations includes one or more slot formats indicated by a respective slotFormats for the slot format combination, and a mapping for the slot format combination provided by slotFormats to a corresponding SFI-index field value in DCI format 2_0 provided by slotFormatCombinationId for unpaired spectrum operation, a reference SCS configuration $\mu_{SFI}$ by subcarrierSpacing and, when a supplementary UL carrier is configured for the serving cell, a reference SCS configuration $\mu_{SFI,SUL}$ by subcarrierSpacing2 for the supplementary UL carrier for paired spectrum operation, a reference SCS configuration $\mu_{SFI,DL}$ for a DL BWP by subcarrierSpacing and a reference SCS configuration $\mu_{SFI,UL}$ for an UL BWP by subcarrierSpacing2 a location of an available RB set indicator field in DCI format 2_0 that is one bit, if intraCellGuardBandsDL-List for the serving cell indicates no intra-cell guard-bands are configured, where a value of '1' indicates that the serving cell is available for receptions, a value of '0' indicates that the serving cell is not available for receptions, by availableRB-SetsPerCell, and the serving cell remains available or unavailable for reception until the end of the remaining channel occupancy duration a bitmap having a one-to-one mapping with the RB sets [6, TS 38.214] of the serving cell, if intraCellGuardBandsDL-List for the serving cell indicates intra-cell guard-bands are configured, where the bitmap includes $N_{RB,set,DL}$ bits and $N_{RB,set,DL}$ is the number of RB sets in the serving cell, a value of '1' indicates that an RB set is available for receptions, a value of '0' indicates that an RB set is not available for receptions, by availableRB-SetsPerCell and a RB set remains available or unavailable for receptions until the end of the remaining channel occupancy duration a location of a channel occupancy duration field in DCI format 2_0, by CO-DurationsPerCell, that indicates a remaining channel occupancy duration for the serving cell starting from a first symbol of a slot where the UE detects the DCI format 2_0 by providing a value from co-DurationList. The channel occupancy duration field includes $\max\{\lceil \log_2(\text{COdurationListSize})\rceil, 1\}$ bits, where COdurationListSize is the number of values provided by co-DurationList. If CO-DurationsPerCell is not provided, the remaining channel occupancy duration for the serving cell is a number of slots, starting from the slot where the UE detects the DCI format 2_0, that the SFI-index field value provides corresponding slot formats a reference SCS configuration for co-DurationList, by subcarrierSpacing-r16 a location of a search space set group switching flag field in DCI format 2_0, by SearchSpaceSwitchTrigger, that indicates a group from two groups of search space sets for PDCCH monitoring for scheduling for the serving cell or the set of serving cells, provided by CellGroupsForSwitching, as described in clause 10.4.

If neither CO-DurationPerCell-r16 nor SlotFormatCombinationsPerCell are provided and if ChannelAccessMode-r16='semistatic' is provided, the procedures in this clause apply with assuming a channel occupancy time defined in clause 4.3 of [15, TS 37.213] is the remaining channel occupancy duration if a DL transmission burst(s) is detected within the channel occupancy time.

A SFI-index field value in a DCI format 2_0 indicates to a UE a slot format for each slot in a number of slots for each DL BWP or each UL BWP starting from a slot where the UE detects the DCI format 2_0. The number of slots is equal to or larger than a PDCCH monitoring periodicity for DCI format 2_0. The SFI-index field includes $\max\{\lceil \log_2(\text{maxSFIindex}+1)\rceil,1\}$ bits where maxSFIindex is the maximum value of the values provided by corresponding slotFormatCombinationId. A slot format is identified by a corresponding format index as provided in Table 11.1.1-1 where 'D' denotes a downlink symbol, 'U' denotes an uplink symbol, and 'F' denotes a flexible symbol.

If a PDCCH monitoring periodicity for DCI format 2_0, provided to a UE for the search space set S by monitoringSlotPeriodicityAndOffset, is smaller than a duration of a slot format combination the UE obtains at a PDCCH monitoring occasion for DCI format 2_0 by a corresponding SFI-index field value, and the UE detects more than one DCI formats 2_0 indicating a slot format for a slot, the UE expects each of the more than one DCI formats 2_0 to indicate a same format for the slot.

A UE does not expect to be configured to monitor PDCCH for DCI format 2_0 on a second serving cell that uses larger SCS than the serving cell.

TABLE 11.1.1-1

Slot formats for normal cyclic prefix

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |

TABLE 11.1.1-1-continued

Slot formats for normal cyclic prefix

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on tdd-UL-DL-ConfigurationCommon, or tdd-UL-DL-ConfigurationDedicated and, if any, on detected DCI formats | | | | | | | | | | | | | |

For unpaired spectrum operation for a UE on a serving cell, the UE is provided by subcarrierSpacing a reference SCS configuration $\mu_{SFI}$ for each slot format in a combination of slot formats indicated by an SFI-index field value in DCI format 2_0. The UE expects that for a reference SCS configuration $\mu_{SFI}$ and for an active DL BWP or an active UL BWP with SCS configuration $\mu$, it is $\mu \geq \mu_{SFI}$. Each slot format in the combination of slot formats indicated by the SFI-index field value in DCI format 2_0 is applicable to $2^{(\mu-\mu_{SFI})}$ consecutive slots in the active DL BWP or the active UL BWP where the first slot starts at a same time as a first slot for the reference SCS configuration $\mu_{SFI}$ and each downlink or flexible or uplink symbol for the reference SCS configuration $\mu_{SFI}$ corresponds to $2^{(\mu=\mu_{SFI})}$ consecutive downlink or flexible or uplink symbols for the SCS configuration $\mu$.

For paired spectrum operation for a UE on a serving cell, the SFI-index field in DCI format 2_0 indicates a combination of slot formats that includes a combination of slot formats for a reference DL BWP and a combination of slot formats for a reference UL BWP of the serving cell. The UE is provided by subcarrierSpacing a reference SCS configuration $\mu_{SFI,DL}$ for the combination of slot formats indicated by the SFI-index field value in DCI format 2_0 for the reference DL BWP of the serving cell. The UE is provided by subcarrierSpacing2 a reference SCS configuration $\mu_{SFI,UL}$ for the combination of slot formats indicated by the SFI-index field value in DCI format 2_0 for the reference UL BWP of the serving cell. If $\mu_{SFI,DL} \leq \mu_{SFI,UL}$ and for each $2^{(\mu_{SFI,DL}-\mu_{SFI,UL})}+1$ values provided by a value of slotFormats, where the value of slotFormats is determined by a value of slotFormatCombinationId in slotFormatCombination and the value of slotFormatCombinationId is set by the value of the SFI-index field value in DCI format 2_0, the first $2^{(\mu_{SFI,DL}-\mu_{SFI,UL})}$ values for the combination of slot formats are applicable to the reference DL BWP and the next value is applicable to the reference UL BWP. If $\mu_{SFI,DL} < \mu_{SFI,UL}$ and for each $2^{(\mu_{SFI,UL}-\mu_{SFI,DL})}+1$ values provided by slotFormats, the first value for the combination of slot formats is applicable to the reference DL BWP and the next $2^{(\mu_{SFI,UL}-\mu_{SFI,DL})}$ values are applicable to the reference UL BWP.

The UE is provided a reference SCS configuration $\mu_{SFI,DL}$ so that for an active DL BWP with SCS configuration $\mu_{DL}$, it is $\mu_{DL} \geq \mu_{SFI,DL}$. The UE is provided a reference SCS configuration $\mu_{SFI,UL}$ so that for an active UL BWP with SCS configuration $\mu_{UL}$, it is $\mu_{UL} \geq \mu_{SFI,UL}$. Each slot format for a combination of slot formats indicated by the SFI-index field value in DCI format 2_0 for the reference DL BWP, by indicating a value for slotFormatCombinationId that is mapped to a value of slotFormats in slotFormatCombination, is applicable to $2^{(\mu_{DL}-\mu_{SFI,DL})}$ consecutive slots for the active DL BWP where the first slot starts at a same time as a first slot in the reference DL BWP and each downlink or flexible symbol for the reference SCS configuration $\mu_{SFI,DL}$ corresponds to $2^{(\mu_{DL}-\mu_{SFI,DL})}$ consecutive downlink or flexible symbols for the SCS configuration $\mu_{DL}$. Each slot format for the combination of slot formats for the reference UL BWP is applicable to $2^{(\mu_{UL}-\mu_{SFI,UL})}$ consecutive slots for the active UL BWP where the first slot starts at a same time as a first slot in the reference UL BWP and each uplink or flexible symbol for the reference SCS configuration $\mu_{SFI,UL}$ corresponds to $2^{(\mu_{UL}-\mu_{SFI,UL})}$ consecutive uplink or flexible symbols for the SCS configuration $\mu_{UL}$.

For unpaired spectrum operation with a second UL carrier for a UE on a serving cell, the SFI-index field value in DCI format 2_0 indicates a combination of slot formats that includes a combination of slot formats for a reference first UL carrier of the serving cell and a combination of slot formats for a reference second UL carrier of the serving cell. The UE is provided by subcarrierSpacing a reference SCS configuration $\mu_{SFI}$ for the combination of slot formats indicated by the SFI-index field in DCI format 2_0 for the reference first UL carrier of the serving cell. The UE is provided by subcarrierSpacing2 a reference SCS configuration $\mu_{SFI,SUL}$ for the combination of slot formats indicated by the SFI-index field value in DCI format 2_0 for the reference second UL carrier of the serving cell. For each $2^{(\mu_{SFI}-\mu_{SFI,SUL})}+1$ values of slotFormats, the first $2^{(\mu_{SFI}-\mu_{SFI,SUL})}$ values for the combination of slot formats are applicable to the reference first UL carrier and the next value is applicable to the reference second UL carrier.

The UE expects to be provided a reference SCS configuration $\mu_{SFI,SUL}$ so that for an active UL BWP in the second UL carrier with SCS configuration $\mu_{SUL}$, is $\mu_{SUL} \geq \mu_{SFI,SUL}$. Each slot format for a combination of slot formats indicated by the SFI-index field in DCI format 2_0 for the reference first UL carrier is applicable to $2^{(\mu-\mu_{SFI})}$ consecutive slots for the active DL BWP and the active UL BWP in the first UL carrier where the first slot starts at a same time as a first slot in the reference first UL carrier. Each slot format for the combination of slot formats for the reference second UL carrier is applicable to $2^{(\mu_{SUL}-\mu_{SFI,SUL})}$ consecutive slots for the active UL BWP in the second UL carrier where the first slot starts at a same time as a first slot in the reference second UL carrier.

If a BWP in the serving cell is configured with $\mu=2$ and with extended CP, the UE expects $\mu_{SFI}=0$, $\mu_{SFI}=1$, or $\mu_{SFI}=2$. A format for a slot with extended CP is determined from a format for a slot with normal CP. A UE determines an extended CP symbol to be a downlink/uplink/flexible symbol if the overlapping normal CP symbols that are downlink/uplink/flexible symbols, respectively. A UE determines an extended CP symbol to be a flexible symbol if one of the overlapping normal CP symbols is flexible. A UE determines an extended CP symbol to be a flexible symbol if the pair of the overlapping normal CP symbols includes a downlink and an uplink symbol.

A reference SCS configuration $\mu_{SFI}$, or $\mu_{SFI,DL}$, or $\mu_{SFI,UL}$, or $\mu_{SFI,SUL}$ is either 0, or 1, or 2 for FR1 and is either 2 or 3 for FR2.

For a set of symbols of a slot, a UE does not expect to detect a DCI format 2_0 with an SFI-index field value indicating the set of symbols of the slot as uplink and to detect a DCI format indicating to the UE to receive PDSCH or CSI-RS in the set of symbols of the slot.

For a set of symbols of a slot, a UE does not expect to detect a DCI format 2_0 with an SFI-index field value indicating the set of symbols in the slot as downlink and to detect a DCI format, a RAR UL grant, fallbackRAR UL grant, or successRAR indicating to the UE to transmit PUSCH, PUCCH, PRACH, or SRS in the set of symbols of the slot.

For a set of symbols of a slot that are indicated by a DCI format 2_0 as being within a remaining channel occupancy duration either by a channel occupancy duration field or by an SFI-index field, a UE does not expect to detect at a later time a DCI format 2_0 indicating, either by a channel occupancy duration field or by an SFI-index field, that any symbol from the set of symbols is not within a remaining channel occupancy duration.

For a set of symbols of a slot that are indicated as downlink/uplink by tdd-UL-DL-ConfigurationCommon, or tdd-UL-DL-ConfigurationDedicated, the UE does not expect to detect a DCI format 2_0 with an SFI-index field value indicating the set of symbols of the slot as uplink/downlink, respectively, or as flexible.

For a set of symbols of a slot corresponding to SS/PBCH blocks with candidate SS/PBCH block indices corresponding to the SS/PBCH block indexes indicated to a UE by ssb-PositionsInBurst in SIB1, or by ssb-PositionsInBurst in ServingCellConfigCommon, as described in clause 4.1, the UE does not expect to detect a DCI format 2_0 with an SFI-index field value indicating the set of symbols of the slot as uplink.

For a set of symbols of a slot corresponding to a valid PRACH occasion and $N_{gap}$ symbols before the valid PRACH occasion, as described in clause 8.1, the UE does not expect to detect a DCI format 2_0 with an SFI-index field value indicating the set of symbols of the slot as downlink.

For a set of symbols of a slot indicated to a UE by pdcch-ConfigSIB1 in MIB for a CORESET for Type0-PDCCH CSS set, the UE does not expect to detect a DCI format 2_0 with an SFI-index field value indicating the set of symbols of the slot as uplink.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255

- if one or more symbols from the set of symbols are symbols in a CORESET configured to the UE for PDCCH monitoring, the UE receives PDCCH in the CORESET only if an SFI-index field value in DCI format 2_0 indicates that the one or more symbols are downlink symbols
- if an SFI-index field value in DCI format 2_0 indicates the set of symbols of the slot as flexible and the UE detects a DCI format indicating to the UE to receive PDSCH or CSI-RS in the set of symbols of the slot, the UE receives PDSCH or CSI-RS in the set of symbols of the slot
- if an SFI-index field value in DCI format 2_0 indicates the set of symbols of the slot as flexible and the UE detects a DCI format, a RAR UL grant, fallbackRAR UL grant, or successRAR indicating to the UE to transmit PUSCH, PUCCH, PRACH, or SRS in the set of symbols of the slot the UE transmits the PUSCH, PUCCH, PRACH, or SRS in the set of symbols of the slot if an SFI-index field value in DCI format 2_0 indicates the set of symbols of the slot as flexible, and the UE does not detect a DCI format indicating to the UE to receive PDSCH or CSI-RS, or the UE does not detect a DCI format, a RAR UL, fallbackRAR UL grant, or successRAR grant indicating to the UE to transmit PUSCH, PUCCH, PRACH, or SRS in the set of symbols of the slot, the UE does not transmit or receive in the set of symbols of the slot if the UE is configured by higher layers to receive PDSCH or CSI-RS in the set of symbols of the slot, the UE receives the PDSCH or the CSI-RS in the set of symbols of the slot only if an SFI-index field value in DCI format 2_0 indicates the set of symbols of the slot as downlink and, if applicable, the set of symbols is within remaining channel occupancy duration if the UE is configured by higher layers to receive DL PRS in the set of symbols of the slot, the UE receives the DL PRS in the set of symbols of the slot only if an SFI-index field value in DCI format 2_0 indicates the set of symbols of the slot as downlink or flexible.

if the UE is configured by higher layers to transmit PUCCH, or PUSCH, or PRACH in the set of symbols of the slot, the UE transmits the PUCCH, or the PUSCH, or the PRACH in the slot only if an SFI-index field value in DCI format 2_0 indicates the set of symbols of the slot as uplink if the UE is configured by higher layers to transmit SRS in the set of symbols of the slot, the UE transmits the SRS only in a subset of symbols from the set of symbols of the slot indicated as uplink symbols by an SFI-index field value in DCI format 2_0 a UE does not expect to detect an SFI-index field value in DCI format 2_0 indicating the set of symbols of the slot as downlink and also detect a DCI format, a RAR UL grant, fallbackRAR UL grant, or successRAR indicating to the UE to transmit SRS, PUSCH, PUCCH, or PRACH, in one or more symbols from the set of symbols of the slot a UE does not expect to detect an SFI-index field value in DCI format 2_0 indicating the set of symbols of the slot as downlink or flexible if the set of symbols of the slot includes symbols corresponding to any repetition of a PUSCH transmission activated by an UL Type 2 grant PDCCH as described in clause 10.2 a UE does not expect to detect an SFI-index field value in DCI format 2_0 indicating the set of symbols of the slot as uplink and also detect a DCI format indicating to the UE to receive PDSCH or CSI-RS in one or more symbols from the set of symbols of the slot If a UE is configured by higher layers to receive a CSI-RS or a PDSCH in a set of symbols of a slot and the UE detects a DCI format 2_0 with a slot format value other than 255 that indicates a slot format with a subset of symbols from the set of symbols as uplink or flexible, or the UE detects a DCI format indicating to the UE to transmit PUSCH, PUCCH, SRS, or PRACH in at least one symbol in the set of the symbols, the UE cancels the CSI-RS reception in the set of symbols of the slot or cancels the PDSCH reception in the slot.

For operation with shared spectrum channel access, if a UE is configured by higher layers to receive a CSI-RS and the UE is provided CO-DurationsPerCell, for a set of symbols of a slot that are indicated as downlink or flexible by tdd-UL-DL-ConfigurationCommon or tdd-UL-DL-ConfigurationDedicated, or when tdd-UL-DL-Configuration-Common and tdd-UL-DL-ConfigurationDedicated are not provided, the UE cancels the CSI-RS reception in the set of symbols of the slot that are not within the remaining channel occupancy duration.

If a UE is configured by higher layers to receive a DL PRS in a set of symbols of a slot and the UE detects a DCI format 2_0 with a slot format value other than 255 that indicates a slot format with a subset of symbols from the set of symbols as uplink, or the UE detects a DCI format indicating to the UE to transmit PUSCH, PUCCH, SRS, or PRACH in at least one symbol in the set of the symbols, the UE cancels the DL PRS reception in the set of symbols of the slot.

If a UE is configured by higher layers to transmit SRS, or PUCCH, or PUSCH, or PRACH in a set of symbols of a slot and the UE detects a DCI format 2_0 with a slot format value other than 255 that indicates a slot format with a subset of symbols from the set of symbols as downlink or flexible, or the UE detects a DCI format indicating to the UE to receive CSI-RS or PDSCH in a subset of symbols from the set of symbols, then If the UE does not indicate the capability of [partialCancellation], the UE does not expect to cancel the transmission of the PUCCH or PUSCH or PRACH in the set of symbols if the first symbol in the set occurs within $T_{proc,2}$ relative to a last symbol of a CORESET where the UE detects the DCI format; otherwise, the UE cancels the PUCCH, or the PUSCH, or an actual repetition of the PUSCH [6, TS38.214], determined from clauses 9 and 9.2.5 or clause 6.1 of [6, TS38.214], or the PRACH transmission in the set of symbols.

If the UE indicates the capability of [partialCancellation], the UE does not expect to cancel the transmission of the PUCCH or PUSCH or PRACH in symbols from the set of symbols that occur within $T_{proc,2}$ relative to a last symbol of a CORESET where the UE detects the DCI format. The UE cancels the PUCCH, or the PUSCH, or an actual repetition of the PUSCH [6, TS 38.214], determined from clauses 9 and 9.2.5 or clause 6.1 of [6, TS 38.214], or the PRACH transmission in remaining symbols from the set of symbols.

The UE does not expect to cancel the transmission of SRS in symbols from the subset of symbols that occur within $T_{proc,2}$ relative to a last symbol of a CORESET where the UE detects the DCI format. The UE cancels the SRS transmission in remaining symbols from the subset of symbols.

$T_{proc,2}$ is the PUSCH preparation time for the corresponding UE processing capability [6, TS 38.214] assuming $d_{2,1}=1$ and $\mu$ corresponds to the smallest SCS configuration between the SCS configuration of the PDCCH carrying the DCI format and the SCS configuration of the SRS, PUCCH, PUSCH or $\mu_r$, where $\mu_r$ corresponds to the SCS configuration of the PRACH if it is 15 kHz or higher; otherwise $\mu_r=0$.

If a UE is configured by higher layers to receive a CSI-RS or detects a DCI format 0_1 indicating to the UE to receive a CSI-RS in one or more RB sets and a set of symbols of a slot, and the UE detects a DCI format 2_0 with bitmap indicating that any RB set from the one or more RB sets is not available for reception, the UE cancels the CSI-RS reception in the set of symbols of the slot.

A UE assumes that flexible symbols in a CORESET configured to the UE for PDCCH monitoring are downlink symbols if the UE does not detect an SFI-index field value in DCI format 2_0 indicating the set of symbols of the slot as flexible or uplink and the UE does not detect a DCI format indicating to the UE to transmit SRS, PUSCH, PUCCH, or PRACH in the set of symbols.

For a set of symbols of a slot that are indicated as flexible by tdd-UL-DL-ConfigurationCommon, and tdd-UL-DL-ConfigurationDedicated if provided, or when tdd-UL-DL-ConfigurationCommon, and tdd-UL-DL-Configuration-Dedicated are not provided to the UE, and if the UE does not detect a DCI format 2_0 providing a slot format for the slot

- the UE receives PDSCH or CSI-RS in the set of symbols of the slot if the UE receives a corresponding indication by a DCI format
- the UE transmits PUSCH, PUCCH, PRACH, or SRS in the set of symbols of the slot if the UE receives a corresponding indication by a DCI format, a RAR UL grant, fallbackRAR UL grant, or successRAR
- the UE receives PDCCH as described in clause 10.1
- if the UE is configured by higher layers to receive PDSCH in the set of symbols of the slot, the UE does not receive the PDSCH in the set of symbols of the slot
- if the UE is configured by higher layers to receive CSI-RS in the set of symbols of the slot, the UE does not receive the CSI-RS in the set of symbols of the slot, except when UE is provided CO-DurationsPerCell and the set of symbols of the slot are within the remaining channel occupancy duration.
- if the UE is configured by higher layers to receive DL PRS in the set of symbols of the slot, the UE receives the DL PRS
- if the UE is configured by higher layers to transmit SRS, or PUCCH, or PUSCH, or PRACH in the set of symbols of the slot and the UE is not provided enable-ConfiguredUL, then
  - if the UE does not indicate the capability of [partial-Cancellation], the UE does not expect to cancel the transmission of the PUCCH, or the PUSCH, or an actual repetition of the PUSCH [6, TS 38.214], as determined in clauses 9 and 9.2.5 or in clause 6.1 of [6. TS 38.214], or the PRACH in the slot if the first symbol of the PUCCH or the PUSCH or actual repetition of the PUSCH or the PRACH in the slot occurs within $T_{proc,2}$ relative to a last symbol of a CORESET where the UE is configured to monitor PDCCH for DCI format 2_0; otherwise, the UE cancels the PUCCH, or the PUSCH, or an actual repetition of the PUSCH [6, TS 38.214], as determined in clauses 9 and 9.2.5 or in clause 6.1 of [6. TS 38.214], or the PRACH in the slot;
  - if the UE indicates the capability of [partialCancellation], the UE does not expect to cancel the transmission of the PUCCH, or the PUSCH, or an actual repetition of the PUSCH [6, TS 38.214], as determined in clauses 9 and 9.2.5 or in clause 6.1 of [6. TS 38.214], or the PRACH in symbols from the set of symbols that occur within $T_{proc,2}$ relative to a last symbol of a CORESET where the UE is configured to monitor PDCCH for DCI format 2_0. The UE cancels the PUCCH, or the PUSCH, or an actual repetition of the PUSCH [6, TS 38.214], as determined in clauses 9 and 9.2.5 or in clause 6.1 of [6. TS 38.214], or the PRACH transmission in remaining symbols from the set of symbols;
  - the UE does not expect to cancel the transmission of SRS in symbols from the set of symbols that occur within $T_{proc,2}$ relative to a last symbol of a CORESET where the UE is configured to monitor PDCCH for DCI format 2_0. The UE cancels the SRS transmission in remaining symbols from the set of symbols;
  - $T_{proc,2}$ is the PUSCH preparation time for the corresponding UE processing capability [6, TS 38.214] assuming $d_{2,1}=1$ and μ corresponds to the smallest SCS configuration between the SCS configuration of the PDCCH carrying the DCI format 2_0 and the SCS configuration of the SRS, PUCCH, PUSCH or $\mu_r$, where $\mu_r$ corresponds to the SCS configuration of the PRACH if it is 15 kHz or higher; otherwise $\mu_r=0$;
- if the UE is configured by higher layers to transmit SRS, or PUCCH, or PUSCH, or PRACH in the set of symbols of the slot and the UE is provided enableConfiguredUL, the UE can transmit the SRS, or PUCCH, or PUSCH, or PRACH, respectively.

For unpaired spectrum operation for a UE on a cell in a frequency band of FR1, and when the scheduling restrictions due to RRM measurements [10, TS 38.133] are not applicable, if the UE detects a DCI format indicating to the UE to transmit in a set of symbols, the UE is not required to perform RRM measurements [10, TS 38.133] based on a SS/PBCH block or CSI-RS reception on a different cell in the frequency band if the SS/PBCH block or CSI-RS reception includes at least one symbol from the set of symbols.

*******************************Quotation-End***************************************

Bandwidth part (BWP) is a new technique to handle a bandwidth and/or a frequency location for reception (e.g., Downlink (DL) bandwidth part) and/or for transmission (e.g., Uplink (UL) bandwidth part), e.g., from the perspective of a User Equipment (UE). The UE is able to adjust its hardware (e.g., Radio Frequency (RF), baseband, FFT, filter, center frequency) so that reception and/or transmission could be done properly with knowledge of BWP. BWP framework provides a good balance between performance, e.g., transmission speed/throughput and power consumption, and also gives a network node a degree of freedom to conduct load balancing. For example, the base station could adjust BWP size (e.g., bandwidth of a bandwidth part) depending on traffic condition of a UE. When there is low/no traffic for a UE, (active) BWP of the UE could be set to a smaller size, e.g., so as to save power consumption. When more traffic is coming/demanding, (active) BWP of the UE could be set to a larger size, e.g., so as to provide higher throughput or transmission speed. A base station could also move a UE from a first portion of a cell bandwidth to a second portion of cell bandwidth, e.g., if the first portion is congested (with too many (active) UE with active BWP within the first portion) and/or the second portion is less congested (with less (active) UE with active BWP within the second portion). There would be a couple of BWPs configured for a UE, and at most one DL BWP/UL BWP is active at a time. There are a couple of ways to change BWP, e.g., by an indication on DCI, by a special event, by a predefined rule, in response to initiation of random access procedure, or in response to expiration of a timer. For Time Division Duplex (TDD), e.g., paired spectrum, since a common center frequency is shared between UL and DL, a DL BWP would be paired with an UL BWP, e.g., DL BWP with one id would be paired with UL BWP with the same id. BWP switches/changes would happen for DL BWP and UL BWP at the same time. For example, when active DL BWP is changed from DL BWP 0 to DL BWP 1, active UL BWP would be changed from UL BWP 0 to UL BWP 1. More details for BWP can be found in the following quotation from [2] 3GPP TS 38.213 V16.6.0, "NR Physical layer procedures for control" and [3] 3GPP TS 38.321 V16.7.0, "NR MAC protocol specification":

********************************Quotation-Start***************************************

12 Bandwidth Part Operation

If the UE is configured with a SCG, the UE shall apply the procedures described in this clause for both MCG and SCG When the procedures are applied for MCG, the terms 'secondary cell', 'secondary cells', 'serving cell', 'serving cells' in this clause refer to secondary cell, secondary cells, serving cell, serving cells belonging to the MCG respectively.

When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

A UE configured for operation in bandwidth parts (BWPs) of a serving cell, is configured by higher layers for the serving cell a set of at most four bandwidth parts (BWPs) for receptions by the UE (DL BWP set) in a DL bandwidth by parameter BWP-Downlink or by parameter initialDownlinkBWP with a set of parameters configured by BWP-DownlinkCommon and BWP-DownlinkDedicated, and a set of at most four BWPs for transmissions by the UE (UL BWP set) in an UL bandwidth by parameter BWP-Uplink or by parameter initialUplinkBWP with a set of parameters configured by BWP-UplinkCommon and BWP-UplinkDedicated.

For operation with shared spectrum channel access, a UE expects that the BWP configured by the parameter initialUplinkBWP provided in UplinkConfigCommonSIB is mapped to only a single RB set.

If a UE is not provided initialDownlinkBWP, an initial DL BWP is defined by a location and number of contiguous PRBs, starting from a PRB with the lowest index and ending at a PRB with the highest index among PRBs of a CORESET for Type0-PDCCH CSS set, and a SCS and a cyclic prefix for PDCCH reception in the CORESET for Type0-PDCCH CSS set; otherwise, the initial DL BWP is provided by initialDownlinkBWP. For operation on the primary cell or on a secondary cell, a UE is provided an initial UL BWP by initialUplinkBWP. If the UE is configured with a supplementary UL carrier, the UE can be provided an initial UL BWP on the supplementary UL carrier by initialUplinkBWP.

If a UE has dedicated BWP configuration, the UE can be provided by firstActiveDownlinkBWP-Id a first active DL BWP for receptions and by firstActiveUplinkBWP-Id a first active UL BWP for transmissions on a carrier of the primary cell.

For each DL BWP or UL BWP in a set of DL BWPs or UL BWPs, respectively, the UE is provided the following parameters for the serving cell as defined in [4, TS 38.211] or [6, TS 38.214]:

a SCS by subcarrierSpacing a cyclic prefix by cyclicPrefix a common RB $$N_{BWP}^{start} = O_{carrier} + RB_{start}$$

and a number of contiguous RBs $$N_{BWP}^{size} = L_{RB}$$

provided by locationAndBandwidth that indicates an offset $RB_{start}$ and a length $L_{RB}$ as RIV according to [6, TS 38.214], setting $$N_{BWP}^{size} = 275,$$

and a value $O_{carrier}$ provided by offsetToCarrier for the subcarrierSpacing an index in the set of DL BWPs or UL BWPs by respective BWP-Id a set of BWP-common and a set of BWP-dedicated parameters by BWP-DownlinkCommon and BWP-DownlinkDedicated for the DL BWP, or BWP-UplinkCommon and BWP-UplinkDedicated for the UL BWP [12, TS 38.331]

For unpaired spectrum operation, a DL BWP from the set of configured DL BWPs with index provided by BWP-Id is linked with an UL BWP from the set of configured UL BWPs with index provided by BWP-Id when the DL BWP index and the UL BWP index are same. For unpaired spectrum operation, a UE does not expect to receive a configuration where the center frequency for a DL BWP is different than the center frequency for an UL BWP when the BWP-Id of the DL BWP is same as the BWP-Id of the UL BWP.

For each DL BWP in a set of DL BWPs of the PCell, a UE can be configured CORESETs for every type of CSS sets and for USS as described in clause 10.1. The UE does not expect to be configured without a CSS set on the PCell in the active DL BWP.

If a UE is provided controlResourceSetZero and searchSpaceZero in PDCCH-ConfigSIB1 or PDCCH-ConfigCommon, the UE determines a CORESET for a search space set from controlResourcesetZero as described in clause 13 and for Tables 13-1 through 13-10, and determines corresponding PDCCH monitoring occasions as described in clause 13 and for Tables 13-11 through 13-15. If the active DL BWP is not the initial DL BWP, the UE determines PDCCH monitoring occasions for the search space set only if the CORESET bandwidth is within the active DL BWP and the active DL BWP has same SCS configuration and same cyclic prefix as the initial DL BWP.

For each UL BWP in a set of UL BWPs of the PCell or of the PUCCH-SCell, the UE is configured resource sets for PUCCH transmissions as described in clause 9.2.1.

A UE receives PDCCH and PDSCH in a DL BWP according to a configured SCS and CP length for the DL BWP. A UE transmits PUCCH and PUSCH in an UL BWP according to a configured SCS and CP length for the UL BWP.

If a bandwidth part indicator field is configured in a DCI format, the bandwidth part indicator field value indicates the active DL BWP, from the configured DL BWP set, for DL receptions as described in [5, TS 38.212]. If a bandwidth part indicator field is configured in a DCI format, the bandwidth part indicator field value indicates the active UL BWP, from the configured UL BWP set, for UL transmissions as described in [5, TS 38.212]. If a bandwidth part indicator field is configured in a DCI format and indicates an UL BWP or a DL BWP different from the active UL BWP or DL BWP, respectively, the UE shall for each information field in the DCI format if the size of the information field is smaller than the one required for the DCI format interpretation for the UL BWP or DL BWP that is indicated by the bandwidth part indicator, the UE prepends zeros to the information field until its size is the one required for the interpretation of the information field for the UL BWP or DL BWP prior to interpreting the DCI format information fields, respectively if the size of the information field is larger than the one required for the DCI format interpretation for the UL BWP or DL BWP that is indicated by the bandwidth part indicator, the UE uses a number of least significant bits of the DCI format equal to the one required for the UL BWP or DL BWP indicated by bandwidth part indicator prior to interpreting the DCI format information fields, respectively set the active UL BWP or DL BWP to the UL BWP or DL BWP indicated by the bandwidth part indicator in the DCI format If a bandwidth part indicator field is configured in a DCI format 0_1 and indicates an active UL BWP with different SCS configuration μ, or with different number $$N_{RB-set,UL}^{BWP}$$

of RB sets, than a current active UL BWP, the UE determines an uplink frequency domain resource allocation Type 2 based on X' bits and Y' bits that are generated by independently truncating or padding the X MSBs and the Y LSBs [6, TS 38.214] of the frequency domain resource assignment field of DCI format 0_1, where truncation starts from the MSBs of the X bits or the Y bits, zero-padding prepends zeros to the X bits or the Y bits, and if the indicated active UL BWP has SCS configuration μ=1 and the current active BWP has SCS configuration μ–0, the X MSBs are truncated to X'=X−1 bits, or if the indicated active UL BWP has SCS configuration μ=0 and the current active BWP has SCS configuration μ=1, the X MSBs are zero-padded to X'=X+1 bits otherwise, the X MSBs are unchanged and the Y LSBs are truncated or zero-padded to $$Y' = \left\lceil \log_2\left(\frac{N_{RB-set,UL}^{BWP}\left(N_{RB-set,UL}^{BWP}+1\right)}{2}\right)\right\rceil \text{ bits}$$

where $$N_{RB-set,UL}^{BWP}$$

is a number of RB sets configured for the indicated active UL BWP

A UE does not expect to detect a DCI format with a BWP indicator field that indicates an active DL BWP or an active UL BWP change with the corresponding time domain resource assignment field providing a slot offset value for a PDSCH reception or PUSCH transmission that is smaller than a delay required by the UE for an active DL BWP change or UL BWP change, respectively [10, TS 38.133].

If a UE detects a DCI format with a BWP indicator field that indicates an active DL BWP change for a cell, the UE is not required to receive or transmit in the cell during a time duration from the end of the third symbol of a slot where the UE receives the PDCCH that includes the DCI format in a scheduling cell until the beginning of a slot indicated by the slot offset value of the time domain resource assignment field in the DCI format.

If a UE detects a DCI format with SCell dormancy indication that indicates an active DL BWP change for an Scell in slot n of primary cell, the UE is not required to receive or transmit in the SCell during a time duration specified in [10, TS 38.133].

If a UE detects a DCI format indicating an active UL BWP change for a cell, the UE is not required to receive or transmit in the cell during a time duration from the end of the third symbol of a slot where the UE receives the PDCCH that includes the DCI format in the scheduling cell until the beginning of a slot indicated by the slot offset value of the time domain resource assignment field in the DCI format.

A UE does not expect to detect a DCI format indicating an active DL BWP change or an active UL BWP change for a scheduled cell within FR1 (or FR2) in a slot other than the first slot of a set of slots for the DL SCS of the scheduling cell that overlaps with a time duration where the UE is not required to receive or transmit, respectively, for an active BWP change in a different cell from the scheduled cell within FR1 (or FR2).

A UE expects to detect a DCI format with a BWP indicator field that indicates an active UL BWP change or an active DL BWP change only if a corresponding PDCCH is received within the first 3 symbols of a slot.

For a serving cell, a UE can be provided by defaultDownlinkBWP-Id a default DL BWP among the configured DL BWPs. If a UE is not provided a default DL BWP by defaultDownlinkBWP-Id, the default DL BWP is the initial DL BWP.

If a UE is provided by bwp-InactivityTimer a timer value for the serving cell [11, TS 38.321] and the timer is running, the UE decrements the timer at the end of a subframe for FR1 or at the end of a half subframe for FR2 if the restarting conditions in [11, TS 38.321] are not met during the interval of the subframe for FR1 or of the half subframe for FR2.

For a cell where a UE changes an active DL BWP due to a BWP inactivity timer expiration and for accommodating a delay in the active DL BWP change or the active UL BWP change required by the UE [10, TS 38.133], the UE is not required to receive or transmit in the cell during a time duration from the beginning of a subframe for FR1, or of half of a subframe for FR2, that is immediately after the BWP inactivity timer expires until the beginning of a slot where the UE can receive or transmit.

When a UE's BWP inactivity timer for a cell within FR1 (or FR2) expires within a time duration where the UE is not required to receive or transmit for an active UL/DL BWP change in the cell or in a different cell within FR1 (or FR2), the UE delays the active UL/DL BWP change triggered by the BWP inactivity timer expiration until a subframe for FR1 or half a subframe for FR2 that is immediately after the UE completes the active UL/DL BWP change in the cell or in the different cell within FR1 (or FR2).

If a UE is provided by firstActiveDownlinkBWP-Id a first active DL BWP and by firstActiveUplinkBWP-Id a first active UL BWP on a carrier of a secondary cell, the UE uses the indicated DL BWP and the indicated UL BWP as the respective first active DL BWP on the secondary cell and first active UL BWP on the carrier of the secondary cell.

A UE does not expect to monitor PDCCH when the UE performs RRM measurements [10, TS 38.133] over a bandwidth that is not within the active DL BWP for the UE.

*******************************Quotation-End***************************************

*******************************Quotation-Start***************************************

5.15 Bandwidth Part (BWP) Operation 5.15.1 Downlink and Uplink

In addition to clause 12 of TS 38.213 [6], this clause specifies requirements on BWP operation.

A Serving Cell may be configured with one or multiple BWPs, and the maximum number of BWP per Serving Cell is specified in TS 38.213 [6].

The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signalling, or by the MAC entity itself upon initiation of Random Access procedure or upon detection of consistent LBT failure on SpCell. Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively (as specified in TS 38.331 [5]) is active without receiving PDCCH indicating a downlink assignment or an uplink grant. The active BWP for a Serving Cell is indicated by either RRC or PDCCH (as specified in TS 38.213 [6]). For unpaired spectrum, a DL BWP is paired with a UL BWP, and BWP switching is common for both UL and DL.

For each SCell a dormant BWP may be configured with dormantBWP-Id by RRC signalling as described in TS 38.331 [5]. Entering or leaving dormant BWP for SCells is done by BWP switching per SCell or per dormancy SCell group based on instruction from PDCCH (as specified in TS 38.213 [6]). The dormancy SCell group configurations are configured by RRC signalling as described in TS 38.331 [5]. Upon reception of the PDCCH indicating leaving dormant BWP, the DL BWP indicated by firstOutsideActiveTimeBWP-Id or by firstWithinActiveTimeBWP-Id (as specified in TS 38.331 [5] and TS 38.213 [6]) is activated. Upon reception of the PDCCH indicating entering dormant BWP, the DL BWP indicated by dormantBWP-Id (as specified in TS 38.331 [5]) is activated. The dormant BWP configuration for SpCell or PUCCH SCell is not supported.

For each activated Serving Cell configured with a BWP, the MAC entity shall:

1> if a BWP is activated and the active DL BWP for the Serving Cell is not the dormant BWP:
  2> transmit on UL-SCH on the BWP;
  2> transmit on RACH on the BWP, if PRACH occasions are configured;
  2> monitor the PDCCH on the BWP;
  2> transmit PUCCH on the BWP, if configured;
  2> report CSI for the BWP;
  2> transmit SRS on the BWP, if configured;
  2> receive DL-SCH on the BWP;
  2> (re-)initialize any suspended configured uplink grants of configured grant Type 1 on the active BWP according to the stored configuration, if any, and to start in the symbol according to rules in clause 5.8.2;
  2> if lbt-FailureRecoveryConfig is configured:
    3> stop the lbt-FailureDetectionTimer, if running;
    3> set LBT_COUNTER to 0;
    3> monitor LBT failure indications from lower layers as specified in clause 5.21.2.
1> if a BWP is activated and the active DL BWP for the Serving Cell is dormant BWP:
  2> stop the bwp-InactivityTimer of this Serving Cell, if running.
  2> not monitor the PDCCH on the BWP;
  2> not monitor the PDCCH for the BWP;
  2> not receive DL-SCH on the BWP;
  2> not report CSI on the BWP, report CSI except aperiodic CSI for the BWP;
  2> not transmit SRS on the BWP;
  2> not transmit on UL-SCH on the BWP;
  2> not transmit on RACH on the BWP;
  2> not transmit PUCCH on the BWP;
  2> clear any configured downlink assignment and any configured uplink grant Type 2 associated with the SCell respectively;
  2> suspend any configured uplink grant Type 1 associated with the SCell;
  2> if configured, perform beam failure detection and beam failure recovery for the SCell if beam failure is detected.
1> if a BWP is deactivated:
  2> not transmit on UL-SCH on the BWP;
  2> not transmit on RACH on the BWP;
  2> not monitor the PDCCH on the BWP;
  2> not transmit PUCCH on the BWP;
  2> not report CSI for the BWP;
  2> not transmit SRS on the BWP;
  2> not receive DL-SCH on the BWP;
  2> clear any configured downlink assignment and configured uplink grant of configured grant Type 2 on the BWP;
  2> suspend any configured uplink grant of configured grant Type 1 on the inactive BWP.

Upon initiation of the Random Access procedure on a Serving Cell, after the selection of carrier for performing Random Access procedure as specified in clause 5.1.1, the MAC entity shall for the selected carrier of this Serving Cell:

1> if PRACH occasions are not configured for the active UL BWP:
  2> switch the active UL BWP to BWP indicated by initialUplinkBWP;
  2> if the Serving Cell is an SpCell:
    3> switch the active DL BWP to BWP indicated by initialDownlinkBWP.
1> else:
  2> if the Serving Cell is an SpCell:
    3> if the active DL BWP does not have the same bwp-Id as the active UL BWP:
      4> switch the active DL BWP to the DL BWP with the same bwp-Id as the active UL BWP.
1> stop the bwp-InactivityTimer associated with the active DL BWP of this Serving Cell, if running
1> if the Serving Cell is SCell:
  2> stop the bwp-InactivityTimer associated with the active DL BWP of SpCell, if running.
1> perform the Random Access procedure on the active DL BWP of SpCell and active UL BWP of this Serving Cell.

If the MAC entity receives a PDCCH for BWP switching of a Serving Cell, the MAC entity shall:

1> if there is no ongoing Random Access procedure associated with this Serving Cell; or 1> if the ongoing Random Access procedure associated with this Serving Cell is successfully completed upon reception of this PDCCH addressed to C-RNTI (as specified in clauses 5.1.4, 5.1.4a, and 5.1.5):

2> cancel, if any, triggered consistent LBT failure for this Serving Cell;

2> perform BWP switching to a BWP indicated by the PDCCH.

If the MAC entity receives a PDCCH for BWP switching for a Serving Cell(s) or a dormancy SCell group(s) while a Random Access procedure associated with that Serving Cell is ongoing in the MAC entity, it is up to UE implementation whether to switch BWP or ignore the PDCCH for BWP switching, except for the PDCCH reception for BWP switching addressed to the C-RNTI for successful Random Access procedure completion (as specified in clauses 5.1.4, 5.1.4a, and 5.1.5) in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure after performing the BWP switching; if the MAC decides to ignore the PDCCH for BWP switching, the MAC entity shall continue with the ongoing Random Access procedure on the Serving Cell.

Upon reception of RRC (re-)configuration for BWP switching for a Serving Cell while a Random Access procedure associated with that Serving Cell is ongoing in the MAC entity, the MAC entity shall stop the ongoing Random Access procedure and initiate a Random Access procedure after performing the BWP switching.

Upon reception of RRC (re-)configuration for BWP switching for a Serving Cell, cancel any triggered LBT failure in this Serving Cell.

The MAC entity shall for each activated Serving Cell configured with bwp-InactivityTimer:

1> if the defaultDownlinkBWP-Id is configured, and the active DL BWP is not the BWP indicated by the defaultDownlinkBWP-Id, and the active DL BWP is not the BWP indicated by the dormantBWP-Id if configured; or 1> if the defaultDownlinkBWP-Id is not configured, and the active DL BWP is not the initialDownlinkBWP, and the active DL BWP is not the BWP indicated by the dormantBWP-Id if configured:

2> if a PDCCH addressed to C-RNTI or CS-RNTI indicating downlink assignment or uplink grant is received on the active BWP; or 2> if a PDCCH addressed to C-RNTI or CS-RNTI indicating downlink assignment or uplink grant is received for the active BWP; or 2> if a MAC PDU is transmitted in a configured uplink grant and LBT failure indication is not received from lower layers; or 2> if a MAC PDU is received in a configured downlink assignment:

3> if there is no ongoing Random Access procedure associated with this Serving Cell; or 3> if the ongoing Random Access procedure associated with this Serving Cell is successfully completed upon reception of this PDCCH addressed to C-RNTI (as specified in clauses 5.1.4, 5.1.4a and 5.1.5):

4> start or restart the bwp-InactivityTimer associated with the active DL BWP.

2> if the bwp-InactivityTimer associated with the active DL BWP expires:

3> if the defaultDownlinkBWP-Id is configured:

4> perform BWP switching to a BWP indicated by the defaultDownlinkBWP-Id.

3> else:

4> perform BWP switching to the initialDownlinkBWP.

NOTE: If a Random Access procedure is initiated on an SCell, both this SCell and the SpCell are associated with this Random Access procedure.

1> if a PDCCH for BWP switching is received, and the MAC entity switches the active DL BWP:

2> if the defaultDownlinkBWP-Id is configured, and the MAC entity switches to the DL BWP which is not indicated by the defaultDownlinkBWP-Id and is not indicated by the dormantBWP-Id if configured; or 2> if the defaultDownlinkBWP-Id is not configured, and the MAC entity switches to the DL BWP which is not the initialDownlinkBWP and is not indicated by the dormantBWP-Id if configured:

3> start or restart the bwp-InactivityTimer associated with the active DL BWP.

********************************Quotation-End*****************************************

Duplexing enhancement has been discussed in 3GPP to enable more frequent UL so as to improve latency and UL coverage. UL transmission and DL transmission could occur on a same symbol for unpaired spectrum (e.g., TDD). More detail regarding duplexing could be found in the below quotation from [3] 3GPP TS 38.321 V16.7.0, "NR MAC protocol specification":

********************************Quotation-Start*****************************************

3 Justification

TDD is widely used in commercial NR deployments. In TDD, the time domain resource is split between downlink and uplink. Allocation of a limited time duration for the uplink in TDD would result in reduced coverage and increased latency. As a possible enhancement on this limitation of the conventional TDD operation, it would be worth studying the feasibility of allowing the simultaneous existence of downlink and uplink, a.k.a. full duplex, or more specifically, subband non-overlapping full duplex at the gNB side within a conventional TDD band.

The NR TDD allows the dynamic/flexible allocation of downlink and uplink in time and CLI handling and RIM for NR were introduced in Rel-16. Nevertheless, further study may be required for CLI handling between the networks of different operators to enable the dynamic/flexible TDD in commercial networks. The inter-operator CLI may be due to either adjacent-channel CLI or co-channel-CLI, or both, depending on the deployment scenario. The main problem not addressed in the previous releases is gNB-to-gNB CLI.

This study aims to identify the feasibility and solutions of duplex evolution in the areas outlined above to provide enhanced coverage, reduced latency, improved system capacity, and improved configuration flexibility for NR TDD operations in unpaired spectrum.

4 Objective 4.1 Objective of SI

The objective of this study is to identify and evaluate the potential enhancements to support duplex evolution for NR TDD in unpaired spectrum.

In this study, the followings are assumed:

Duplex enhancement at the gNB side

Half duplex operation at the UE side

No restriction on frequency ranges

The detailed objectives are as follows:

Identify applicable and relevant deployment scenarios and use cases (RAN1).

Develop evaluation methodology for duplex enhancement (RAN1).

Study the subband non-overlapping full duplex and potential enhancements on dynamic/flexible TDD.

Identify possible schemes and evaluate their feasibility and performances (RAN1).

Study inter-gNB and inter-UE CLI handling and identify solutions to manage them (RAN1).

Study their impacts on inter-gNB interfaces if needed (RAN3).

Consider intra-subband CLI and inter-subband CLI in case of the subband non-overlapping full duplex.

Study the performance of the identified schemes as well as the impact on legacy operation assuming their co-existence in co-channel and adjacent channels (RAN1).

Study the impact on RF requirements considering the self-interference, the inter-subband CLI, and the inter-operator CLI at gNB and the inter-subband CLI and inter-operator CLI at UE (RAN4).

Study the impact on RF requirements considering adjacent-channel co-existence with the legacy operation (RAN4).

RAN4 should be involved early to provide necessary information to RANI as needed and to study the feasibility aspects due to high impact in antenna/RF and algorithm design, which include antenna isolation, TX IM suppression in the RX part, filtering and digital interference suppression.

Summarize the regulatory aspects that have to be considered for deploying the identified duplex enhancements in TDD unpaired spectrum (RAN4).

Note: For potential enhancements on dynamic/flexible TDD, utilize the outcome of discussion in Rel-15 and Rel-16 while avoiding the repetition of the same discussion.

********************************Quotation-End****************************************

Issues and Solutions

Enhancement on duplexing schemes could have impact on how a User Equipment (UE) handles Downlink (DL) reception or Uplink (UL) transmission. For example, on a conventional DL symbol (e.g., without duplexing enhancement), a UE would not perform UL transmission on such symbol, e.g., cancel a configured UL transmission on the symbol or does not expect a Downlink Control Information (DCI) schedule UL transmission on the symbol (network (NW) shall not perform such scheduling and/or UE consider such scheduling as an error case). Similar restriction on DL reception could be applied for a conventional UL symbol. The indicated transmission direction applies to all/whole frequency resources of a bandwidth part/serving cell. However, when one symbol could support more than one transmission direction, e.g., for both DL and UL, under duplexing enhancements such restriction may not hold any longer. For example, a UE may be able to perform UL transmission on a symbol indicated as DL. Whether duplexing enhancement is applicable may be subject to isolation between DL transmission and UL reception at the base station side. For example, isolation could come from separation in frequency domain. UL and DL could use a same symbol while using different (e.g., non-overlapping) frequency resources. With the location of frequency resource for UL and DL becoming different, the operation for UL/DL Bandwidth Part (BWP) may require some further adjustments. More specifically, the gNB may want to adjust frequency location of UL BWP, while frequency location of the DL BWP could be kept the same. However, given UL BWP and DL BWP are linked together, change of DL BWP would result in change of UL BWP, which is undesired and has impact on duplexing enhancement.

A first concept of the present invention is to disable link between UL BWP and DL BWP for unpaired spectrum. (Active) UL BWP change and (active) DL BWP change are performed independently/separately for unpaired spectrum. Disabling the link is due to duplexing enhancement. The link is not disabled when duplexing enhancement is not applied (e.g., by a base station). The base station would indicate whether link between UL BWP and DL BWP is disabled (e.g., due to apply duplexing enhancement). The UE would perform UL BWP change and DL BWP change independently and/or separately when the base station indicates the link is disabled. The UE would perform UL BWP change and DL BWP change jointly when the base station indicates the link is enabled or not disabled. Active UL BWP of the UE and Active DL BWP of the UE does not have a same center frequency.

A second concept of the present invention is to introduce a smaller unit than BWP, e.g., sub-BWP. Sub-BWP could be used to indicate frequency resource(s) and/or transmission direction for duplexing enhancement. UL sub-BWP could be a part/subset of frequency resource within UL BWP. DL sub-BWP could be a part/subset of frequency resource within DL BWP. (Active) UL sub-BWP indicates frequency resource(s) that could be used for UL (transmission/reception). (Active) DL sub-BWP indicates frequency resource(s) that could be used for DL (reception/transmission). UL sub-BWP is not linked with DL sub-BWP. (Active) UL sub-BWP switch and (active) DL sub-BWP switch are performed separately/independently. A UE can be configured with one or more DL sub-BWPs within a DL BWP. A UE can be configured with one or more UL sub-BWPs within an UL BWP. There may be one active DL sub-BWP and/or one active UL sub-BWP at a time. There may be more than one active DL sub-BWP and/or more than one active UL sub-BWP at a time. The UE performs UL transmission and/or DL reception based on (active) UL sub-BWP and/or active DL sub-BWP.

A third concept of the present invention is to introduce a BWP group(s). One (or each) BWP group could comprise one or more BWPs. (Active) UL BWP switch/change within one BWP group would not result in (active) DL BWP switch/change. (Active) UL BWP switch/change across two BWP groups would result in (active) DL BWP switch/ change. (Active) DL BWP switch/change within one BWP group would not result in (active) UL BWP switch/change. (Active) DL BWP switch/change across two BWP groups would result in (active) UL BWP switch/change. For example, DL BWP 0, DL BWP 1 are associated with DL BWP group 0, DL BWP 2, DL BWP 3 are associated with DL BWP group 1, UL BWP 0, UL BWP 1 are associated with UL BWP group 0, UL BWP 2, UL BWP 3 are associated with UL BWP group 1. Assume active DL BWP is DL BWP 0 and active UL BWP is UL BWP 0. If/when active DL BWP changes from DL BWP 0 to DL BWP 1, active UL BWP could be kept as UL BWP 0 (e.g., as DL BWP 0 and DL BWP 1 belong to a same BWP group). If/when active DL BWP changes from DL BWP 0 to DL BWP 2, active UL BWP is changed from UL BWP 0 to UL BWP 2 accordingly (e.g., as DL BWP 0 and DL BWP 2 belong to two different BWP groups).

In one embodiment, a UE is configured with at least a first DL BWP and a second DL BWP. The UE is configured with at least a first UL BWP and a second UL BWP. The first DL BWP has the same id as the first UL BWP. The second DL BWP has the same id as the second UL BWP. The UE operates in unpaired spectrum. The UE is indicated that UL BWP change and DL BWP change are performed separately and independently. The UE is indicated that UL BWP is not linked with DL BWP. The UE is indicated that UL BWP with one id is not linked with DL BWP with the one id. The UE performs UL BWP and DL BWP change independently and/or separately, e.g., based on the indication. Active DL BWP of the UE is DL BWP 0. Active UL BWP of the UE is UL BWP 0. The UE changes/switches its active DL BWP from DL BWP 0 to DL BWP 1. The UE does not change/switch its active UL BWP from UL BWP 0 to UL BWP 1. The UE does not change/switch its active UL BWP from UL BWP 0 to UL BWP 1 (even) if the UE changes/switches its active DL BWP from DL BWP 0 to DL BWP 1. The UE does not change/switch its active UL BWP from UL BWP 0 to UL BWP 1 in response to changes/switches of its active DL BWP from DL BWP 0 to DL BWP 1. The UE keeps its active UL BWP as UL BWP 0. UL BWP 0 and DL BWP does not have the same center frequency. The UE keeps its active UL BWP as UL BWP 0 (even) if the UE changes/switches its active DL BWP from DL BWP 0 to DL BWP 1. The UE keeps its active UL BWP as UL BWP 0 in response to changes/switches of its active DL BWP from DL BWP 0 to DL BWP 1. The UE performs UL BWP change and DL BWP change jointly if the UE is not indicated that UL BWP change and DL BWP change are performed separately and independently. The UE links UL BWP with DL BWP if the UE is not indicated that UL BWP is not linked with DL BWP. The UE links UL BWP with one id with DL BWP with the one id if the UE is not indicated that UL BWP with one id is not linked with DL BWP with the one id. The UE performs UL BWP and DL BWP change jointly, e.g., based on absence of the indication. Active DL BWP of the UE is DL BWP 0. Active UL BWP of the UE is UL BWP 0. The UE changes/switches its active DL BWP from DL BWP 0 to DL BWP 1. The UE changes/switches its active UL BWP from UL BWP 0 to UL BWP 1 if the UE is not indicated that UL BWP change and DL BWP change are performed separately and independently. The UE changes/switches its active UL BWP from UL BWP 0 to UL BWP 1 if the UE changes/switches its active DL BWP from DL BWP 0 to DL BWP 1 and/or if the UE is not indicated that UL BWP change and DL BWP change are performed separately and independently. The UE changes/switches its active UL BWP from UL BWP 0 to UL BWP 1 in response to changes/switches of its active DL BWP from DL BWP 0 to DL BWP 1 and/or if the UE is not indicated that UL BWP change and DL BWP change are performed separately and independently.

In another embodiment, a base station configures a UE with at least a first DL BWP and a second DL BWP. The base station configures the UE at least a first UL BWP and a second UL BWP. The first DL BWP has the same id as the first UL BWP. The second DL BWP has the same id as the second UL BWP. The base station operates in unpaired spectrum. The base station indicates the UE that UL BWP change and DL BWP change are performed separately and independently. The base station indicates the UE that UL BWP is not linked with DL BWP. The base station indicates the UE that UL BWP with one id is not linked with DL BWP with the one id. The base station performs UL BWP and DL BWP change for the UE independently and/or separately, e.g., based on the indication. Active DL BWP for the UE is DL BWP 0. Active UL BWP for the UE is UL BWP 0. The base station changes/switches its active DL BWP for the UE from DL BWP 0 to DL BWP 1. The base station does not change/switch its active UL BWP for the UE from UL BWP 0 to UL BWP 1. The base station does not change/switch its active UL BWP for the UE from UL BWP 0 to UL BWP 1 (even) if the base station changes/switches its active DL BWP for the UE from DL BWP 0 to DL BWP 1. The base station does not change/switch its active UL BWP for the UE from UL BWP 0 to UL BWP 1 in response to changes/switches of its active DL BWP for the UE from DL BWP 0 to DL BWP 1. The base station keeps its active UL BWP for the UE as UL BWP 0. The base station keeps its active UL BWP for the UE as UL BWP 0 (even) if the base station changes/switches its active DL BWP for the UE from DL BWP 0 to DL BWP 1. The base station keeps its active UL BWP for the UE as UL BWP 0 in response to changes/switches of its active DL BWP for the UE from DL BWP 0 to DL BWP 1. The base station performs UL BWP change for the UE and DL BWP change for the UE jointly if the base station does not indicate the UE that UL BWP change and DL BWP change are performed separately and/or independently. The base station links UL BWP for the UE with DL BWP for the UE if the base station does not indicate the UE that UL BWP change and DL BWP change are performed separately and/or independently. The UE links UL BWP for the UE with one id with DL BWP for the UE with the one id if the base station does not indicate the UE that UL BWP with one id is not linked with DL BWP with the one id. The base station performs UL BWP change for the UE and DL BWP change for the UE jointly, e.g., based on absence of the indication. Active DL BWP for the UE is DL BWP 0. Active UL BWP for the UE is UL BWP 0. The base station changes/switches its active DL BWP for the UE from DL BWP 0 to DL BWP 1. The base station changes/switches its active UL BWP for the UE from UL BWP 0 to UL BWP 1 if the base station does not indicate the UE that UL BWP change for the UE and DL BWP change for the UE are performed separately and independently. The base station changes/switches its active UL BWP for the UE from UL BWP 0 to UL BWP 1 if the base station changes/switches its active DL BWP for the UE from DL BWP 0 to DL BWP 1 and/or if the base station does not indicate the UE that UL BWP change for UE and DL BWP change for UE are performed separately and independently. The base station changes/switches its active UL BWP for the UE from UL BWP 0 to UL BWP 1 in response to changes/switches of its active DL BWP for the UE from DL BWP 0 to DL BWP 1 and/or if the base station does not indicate the UE that UL BWP change and DL BWP change are performed separately and independently.

In another embodiment, a UE is configured with at least one DL BWP and at least one UL BWP. One DL BWP is associated with one or more DL sub-BWPs. One UL BWP is associated with one or more UL sub-BWPs. A DL sub-BWP is/comprises one or more PRBs. A DL sub-BWP is with a frequency resource of its associated DL BWP. A DL sub-BWP occupies a subset of frequency resource of its associated DL BWP. A first DL BWP is active DL BWP of the UE. One or more DL sub-BWPs associated with the first DL BWP could be active DL sub-BWP(s) of the UE. A first DL sub-BWP is associated with the first DL BWP. A second DL sub-BWP is associated with the first DL BWP. Both the first DL sub-BWP and the second DL sub-BWP are active DL sub-BWPs. Either the first DL sub-BWP or the second DL sub-BWP is active DL sub-BWP. DL sub-BWP(s) indicates frequency resource(s) available for DL. Active DL sub-BWP(s) indicates frequency resource(s) available for DL (reception) and/or used for DL (reception). Frequency resource(s) indicated by active DL sub-BWP(s) are not available for UL (transmission) and/or not used for UL (transmission). The UE determines whether to perform/cancel a DL reception and/or UL transmission based on (frequency resources of) its active DL sub-BWP(s). For example, determination could be at least based on frequency resource of active DL sub-BWP(s) and/or frequency resource of DL reception (or frequency resource of UL transmission). A UE performs a DL reception if/when frequency resource of the DL reception is within frequency resources of (active) DL sub-BWP(s). A UE does not perform (or cancel) a DL reception if/when frequency resource of the DL reception is not within frequency resources of (active) DL sub-BWP(s). A UE does not perform (or cancel) a DL reception if/when (at least part of) frequency resource of the DL reception is outside frequency resources of (active) DL sub-BWP(s). A UE does not perform (or cancel) an UL transmission if/when frequency resource of the UL transmission is within frequency resources of (active) DL sub-BWP(s). A UE performs an UL transmission if/when frequency resource of the UL transmission is not within frequency resources of (active) DL sub-BWP(s). A UE performs an UL transmission if/when (at least part of) frequency resource of the UL transmission is outside frequency resources of (active) DL sub-BWP(s). An UL sub-BWP is/comprises one or more PRBs. An UL sub-BWP is with a frequency resource of its associated UL BWP. An UL sub-BWP occupies a subset of frequency resource of its associated UL BWP. A first UL BWP is active UL BWP of the UE. One or more UL sub-BWPs associated with the first UL BWP could be active UL sub-BWP(s) of the UE. A first UL sub-BWP is associated with the first UL BWP. A second UL sub-BWP is associated with the first UL BWP. Both the first UL sub-BWP and the second UL sub-BWP are active UL sub-BWPs. Either the first UL sub-BWP or the second UL sub-BWP is active UL sub-BWP. UL sub-BWP(s) indicates frequency resource(s) available for UL. Active UL sub-BWP(s) indicates frequency resource(s) available for UL (transmission) and/or used for UL (transmission). Frequency resource(s) indicated by active UL sub-BWP(s) are not available for DL (reception) and/or not used for DL (reception). The UE determines whether to perform/cancel a DL reception and/or UL transmission based on (frequency resources of) its active UL sub-BWP(s). For example, determination could be at least based on frequency resource of active UL sub-BWP(s) and/or frequency resource of DL reception (or frequency resource of UL transmission). A UE performs an UL transmission if/when frequency resource of the UL transmission is within frequency resources of (active) UL sub-BWP(s). A UE does not perform (or cancel) an UL transmission if/when frequency resource of the UL transmission is not within frequency resources of (active) UL sub-BWP(s). A UE does not perform (or cancel) an UL transmission if/when (at least part of) frequency resource of the UL transmission is outside frequency resources of (active) UL sub-BWP(s). A UE does not perform (or cancel) a DL reception if/when frequency resource of the DL reception is within frequency resources of (active) UL sub-BWP(s). A UE performs a DL reception if/when frequency resource of the DL reception is not within frequency resources of (active) UL sub-BWP(s). A UE performs a DL reception if/when (at least part of) frequency resource of the DL reception is outside frequency resources of (active) UL sub-BWP(s).

In another embodiment, a base station configures a UE with at least one DL BWP and at least one UL BWP. One DL BWP is associated with one or more DL sub-BWPs. One UL BWP is associated with one or more UL sub-BWPs. A DL sub-BWP is/comprises one or more PRBs. A DL sub-BWP is with a frequency resource of its associated DL BWP. A DL sub-BWP occupies a subset of frequency resources of its associated DL BWP. A first DL BWP is active DL BWP for the UE. One or more DL sub-BWPs associated with the first DL BWP could be active DL sub-BWP(s) for the UE. A first DL sub-BWP is associated with the first DL BWP. A second DL sub-BWP is associated with the first DL BWP. Both the first DL sub-BWP and the second DL sub-BWP are active DL sub-BWPs. Either the first DL sub-BWP or the second DL sub-BWP is active DL sub-BWP. DL sub-BWP(s) indicates frequency resource(s) available for DL. Active DL sub-BWP(s) indicates frequency resource(s) available for DL (transmission) and/or used for DL (transmission). Frequency resource(s) indicated by active DL sub-BWP(s) are not available for UL (reception) and/or not used for UL (reception). The base station determines whether to perform/cancel a DL transmission for the UE and/or UL reception for the UE based on (frequency resources of) active DL sub-BWP(s) for the UE. For example, determination could be at least based on frequency resource of (active) DL sub-BWP(s) for the UE and/or frequency resource of DL transmission (or frequency resource of UL reception). A base station performs a DL transmission if/when frequency resource of the DL transmission is within frequency resources of (active) DL sub-BWP(s). A base station does not perform (or cancel) a DL transmission if/when frequency resource of the DL transmission is not within frequency resources of (active) DL sub-BWP(s). A base station does not perform (or cancel) a DL transmission if/when (at least part of) frequency resource of the DL transmission is outside frequency resources of (active) DL sub-BWP(s). A base station does not perform (or cancel) an UL reception if/when frequency resource of the UL reception is within frequency resources of (active) DL sub-BWP(s). A base station performs an UL reception if/when frequency resource of the UL reception is not within frequency resources of (active) DL sub-BWP(s). A base station performs an UL reception if/when (at least part of) frequency resource of the UL reception is outside frequency resources of (active) DL sub-BWP(s). An UL sub-BWP is/comprises one or more PRBs. An UL sub-BWP is with a frequency resource of its associated UL BWP. An UL sub-BWP occupies a subset of frequency resource of its associated UL BWP. A first UL BWP is active UL BWP of the UE. One or more UL sub-BWPs associated with the first UL BWP could be active UL sub-BWP(s) of the UE. A first UL sub-BWP is associated with the first UL BWP. A second UL sub-BWP is associated with the first UL BWP. Both the first UL sub-BWP and the second UL sub-BWP are active UL sub-BWPs. Either the first UL sub-BWP or the second UL sub-BWP is active UL sub-BWP. UL sub-BWP(s) indicates frequency resource(s) available for UL. Active UL sub-BWP(s) indicates frequency resource(s) available for UL (reception) and/or used for UL (reception). Frequency resource(s) indicated by active UL sub-BWP(s) are not available for DL (transmission) and/or not used for DL (transmission). The base station determines whether to perform/cancel a DL transmission for the UE and/or UL reception for the UE based on (frequency resources of) active UL sub-BWP(s) for the UE. For example, determination could be at least based on frequency resource of active UL sub-BWP(s) and/or frequency resource of DL transmission (or frequency resource of UL reception). A base station performs an UL reception if/when frequency resource of the UL reception is within frequency resources of (active) UL sub-BWP(s). A base station does not perform (or cancel) an UL reception if/when frequency resource of the UL reception is not within frequency resources of (active) UL sub-BWP(s). A base station does not perform (or cancel) an UL reception if/when (at least part of) frequency resource of the UL reception is outside frequency resources of (active) UL sub-BWP(s). A base station does not perform (or cancel) a DL transmission if/when frequency resource of the DL transmission is within frequency resources of (active) UL sub-BWP(s). A base station performs a DL transmission if/when frequency resource of the DL transmission is not within frequency resources of (active) UL sub-BWP(s). A base station performs a DL transmission if/when (at least part of) frequency resource of the DL transmission is outside frequency resources of (active) UL sub-BWP(s).

Throughout various embodiments, the present invention describes behavior or operation of a single serving cell unless otherwise noted.

Throughout various embodiments, the present invention describes behavior or operation of multiple serving cells unless otherwise noted.

Throughout various embodiments, the present invention describes behavior or operation of a single bandwidth part unless otherwise noted.

Throughout various embodiments of the present invention, a base station configures multiple bandwidth parts to the UE unless otherwise noted.

Throughout various embodiments of the present invention, a base station configures a single bandwidth part to the UE unless otherwise noted.

Figure 6:
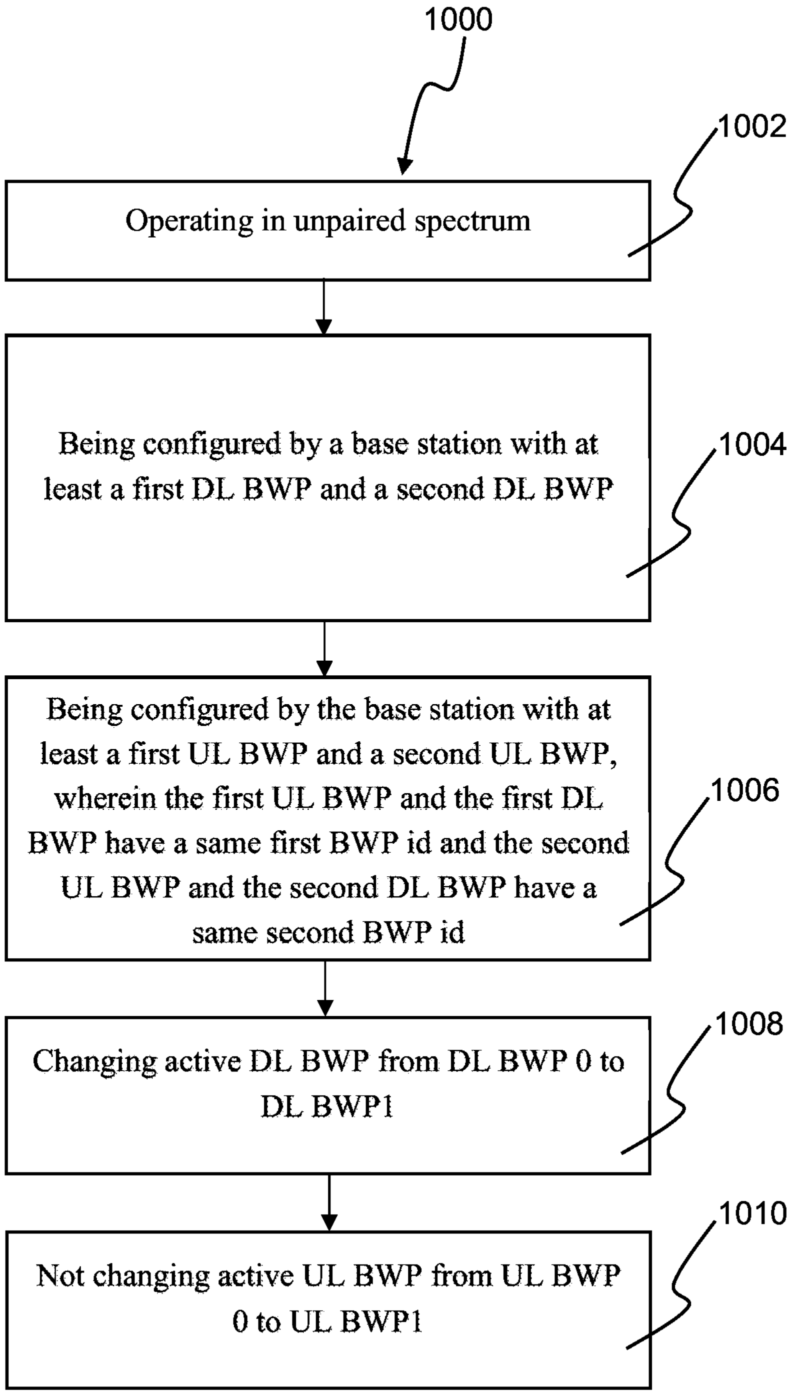
FIG. 6 is a flow diagram of a UE operating in unpaired spectrum, being configured by a base station with at least a first DL BWP and a second DL BWP, being configured by the base station with at least a first UL BWP and a second UL BWP, changing active DL BWP, and not changing active UL BWP, in accordance with embodiments of the present invention.

Referring to FIG. 6, with this and other concepts, systems, and methods of the present invention, a method 1000 for a UE in a wireless communication system comprises operating in unpaired spectrum (step 1002), being configured by a base station with at least a first DL BWP and a second DL BWP (step 1004), being configured by the base station with at least a first UL BWP and a second UL BWP, wherein the first UL BWP and the first DL BWP have a same first BWP id and the second UL BWP and the second DL BWP have a same second BWP id (step 1006), changing active DL BWP from DL BWP 0 to DL BWP 1 (step 1008), and not changing active UL BWP from UL BWP 0 to UL BWP 1 (step 1010).

Referring back to FIGS. 3 and 4, in one or more embodiments from the perspective of a UE, the device 300 includes a program code 312 stored in memory 310 of the transmitter. The CPU 308 could execute program code 312 to: (i) operate in unpaired spectrum (ii) be configured by a base station with at least a first DL BWP and a second DL BWP; (iii) be configured by the base station with at least a first UL BWP and a second UL BWP, wherein the first UL BWP and the first DL BWP have a same first BWP id and the second UL BWP and the second DL BWP have a same second BWP id; (iv) change active DL BWP from DL BWP 0 to DL BWP 1; and (v) not change active UL BWP from UL BWP 0 to UL BWP 1. Moreover, the CPU 308 can execute the program code 312 to perform all of the described actions, steps, and methods described above, below, or otherwise herein.

Figure 7:
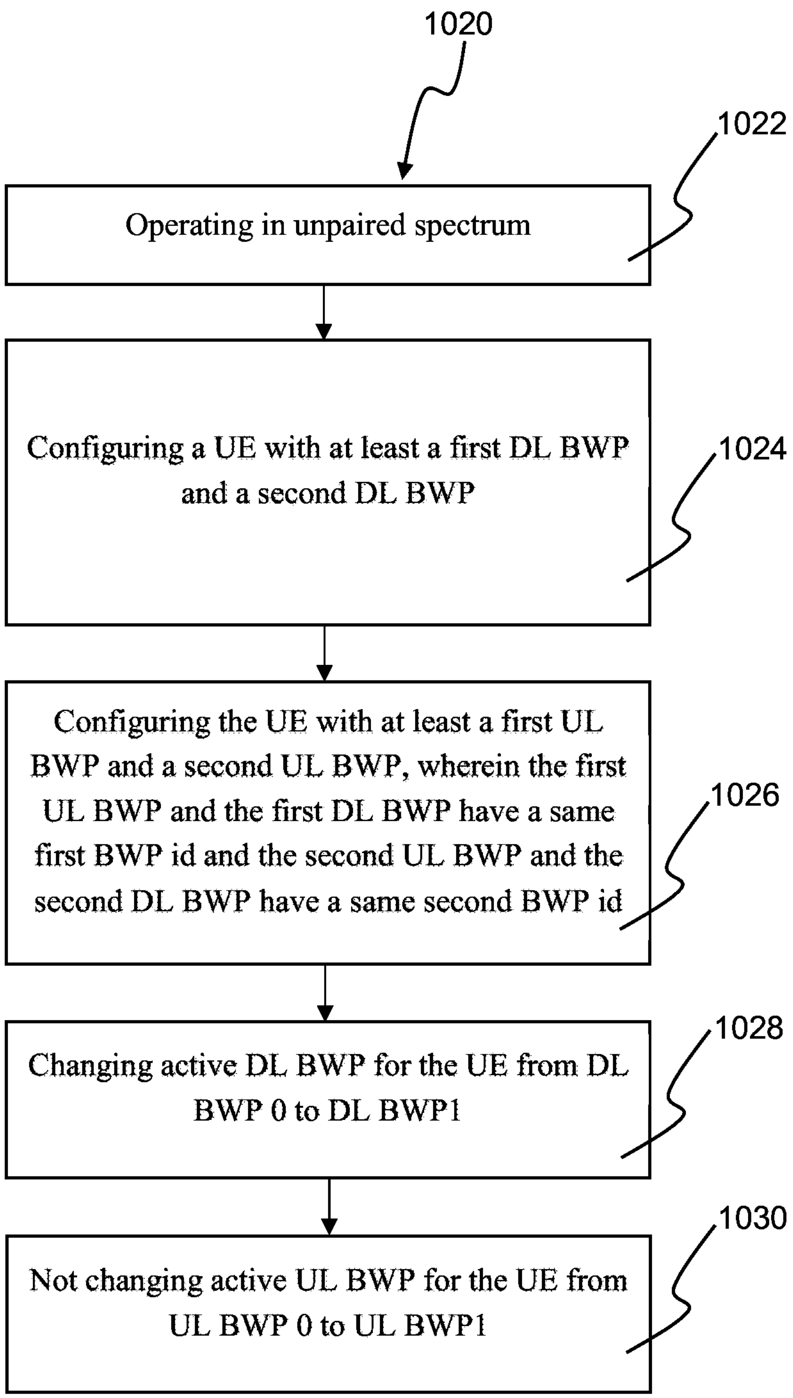
FIG. 7 is a flow diagram of a base station operating in unpaired spectrum, configuring a UE with at least a first DL BWP and a second DL BWP, configuring the UE with at least a first UL BWP and a second UL BWP, changing active DL BWP for the UE, and not changing active UL BWP for the UE, in accordance with embodiments of the present invention.

Referring to FIG. 7, with this and other concepts, systems, and methods of the present invention, a method 1020 for a base station in a wireless communication system comprises operating in unpaired spectrum (step 1022), configuring a UE with at least a first DL BWP and a second DL BWP (step 1024), configuring the UE with at least a first UL BWP and a second UL BWP, wherein the first UL BWP and the first DL BWP have a same first BWP id and the second UL BWP and the second DL BWP have a same second BWP id (step 1026), changing active DL BWP for the UE from DL BWP 0 to DL BWP 1 (step 1028), and not changing active UL BWP for the UE from UL BWP 0 to UL BWP 1 (step 1030).

Referring back to FIGS. 3 and 4, in one or more embodiments from the perspective of a base station, the device 300 includes a program code 312 stored in memory 310 of the transmitter. The CPU 308 could execute program code 312 to: (i) operate in unpaired spectrum; (ii) configure a UE with at least a first DL BWP and a second DL BWP; (iii) configure the UE with at least a first UL BWP and a second UL BWP, wherein the first UL BWP and the first DL BWP have a same first BWP id and the second UL BWP and the second DL BWP have a same second BWP id; (iv) change active DL BWP for the UE from DL BWP 0 to DL BWP 1; and (v) not change active UL BWP for the UE from UL BWP 0 to UL BWP 1. Moreover, the CPU 308 can execute the program code 312 to perform all of the described actions, steps, and methods described above, below, or otherwise herein.

For the embodiments, examples, and concepts detailed above and herein, the following aspects and embodiments are possible.

In various embodiments, active UL BWP is kept as UL BWP 0.

In various embodiments, UL BWP change and DL BWP change are performed separately and/or independently.

In various embodiments, an indication is transmitted from the base station to the UE to indicate UL BWP change and DL BWP change are performed separately and/or independently.

In various embodiments, UL BWP is not linked with DL BWP.

In various embodiments, UL BWP change is not performed (even) if/when Dl BWP is changed.

In various embodiments, UL BWP is kept the same (even) if/when Dl BWP is changed.

In various embodiments, active UL BWP for the UE and active Dl BWP for the UE have different center frequencies.

In various embodiments, the second DL BWP and the first UL BWP have different center frequencies.

Figure 8:
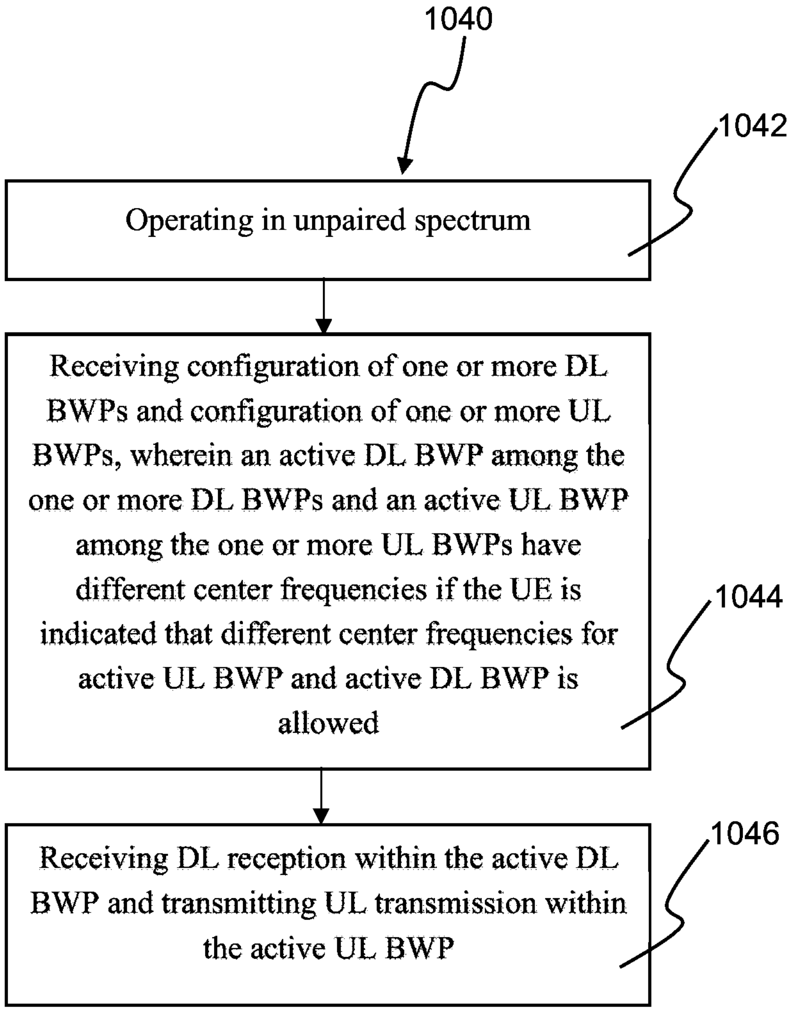
FIG. 8 is a flow diagram of a UE operating in unpaired spectrum, receiving configuration of one or more DL BWPs and configuration of one or more UL BWPS, and receiving DL reception within the active DL BWP and transmitting UL transmission within the active UL BWP, in accordance with embodiments of the present invention.

Referring to FIG. 8, with this and other concepts, systems, and methods of the present invention, a method 1040 for a UE in a wireless communication system comprises operating in unpaired spectrum (step 1042), receiving configuration of one or more DL BWPs and configuration of one or more UL BWPs, wherein an active DL BWP among the one or more DL BWPs and an active UL BWP among the one or more UL BWPs have different center frequencies if the UE is indicated that different center frequencies for active UL BWP and active DL BWP is allowed (step 1044), and receiving DL reception within the active DL BWP and transmitting UL transmission within the active UL BWP (step 1046).

For the embodiments, examples, and concepts detailed above and herein, the following aspects and embodiments are possible.

In various embodiments, the UE does not expect center frequency of the active DL BWP and center frequency of the active UL BWP to be different if the UE is not indicated that different center frequencies for active UL BWP and active DL BWP is allowed.

In various embodiments, the active DL BWP and the active UL BWP have different BWP ids if the UE is indicated that active UL BWP and active DL BWP could have different center frequencies.

In various embodiments, the UE is indicated that different center frequencies for active UL BWP and active DL BWP are allowed if duplexing enhancement or subband non-overlap full duplex is enabled.

In various embodiments, the UE is not indicated that different center frequencies for active UL BWP and active DL BWP are allowed if duplexing enhancement or subband non-overlap full duplex is not enabled.

Referring back to FIGS. 3 and 4, in one or more embodiments from the perspective of a UE, the device 300 includes a program code 312 stored in memory 310 of the transmitter. The CPU 308 could execute program code 312 to: (i) operate in unpaired spectrum (ii) receive configuration of one or more DL BWPs and configuration of one or more UL BWPs, wherein an active DL BWP among the one or more DL BWPs and an active UL BWP among the one or more UL BWPs have different center frequencies if the UE is indicated that different center frequencies for active UL BWP and active DL BWP is allowed; and (iii) receive DL reception within the active DL BWP and transmitting UL transmission within the active UL BWP. Moreover, the CPU 308 can execute the program code 312 to perform all of the described actions, steps, and methods described above, below, or otherwise herein.

Figure 9:
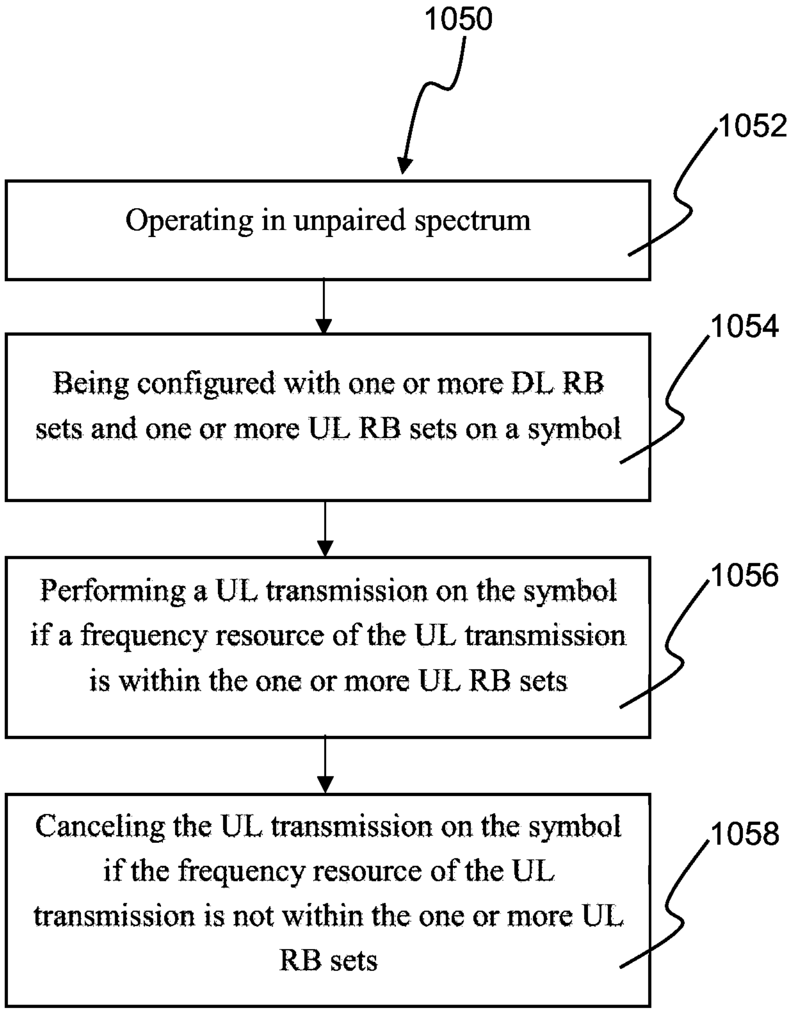
FIG. 9 is a flow diagram of a UE operating in unpaired spectrum, being configured with one or more DL RB sets and one or more UL RB sets on a symbol, performing an UL transmission on the symbol, and canceling the UL transmission on the symbol, in accordance with embodiments of the present invention.

Referring to FIG. 9, with this and other concepts, systems, and methods of the present invention, a method 1050 for a UE in a wireless communication system comprises operating in unpaired spectrum (step 1052), being configured with one or more DL RB sets and one or more UL RB sets on a symbol (step 1054), performing an UL transmission on the symbol if a frequency resource of the UL transmission is within the one or more UL RB sets (step 1056), and canceling the UL transmission on the symbol if the frequency resource of the UL transmission is not within the one or more UL RB sets (step 1058).

For the embodiments, examples, and concepts detailed above and herein, the following aspects and embodiments are possible.

In various embodiments, the UE performs a DL reception if frequency resource of the DL reception is within the one or more DL RB sets and/or the UE cancels a DL reception if frequency resource of the DL reception is not within the one or more DL RB sets.

In various embodiments, the UE cancels the UL transmission on the symbol if the frequency resource of the UL transmission is within the one or more DL RB sets.

In various embodiments, the one or more UL RB sets and the one or more DL RB sets are indicated by one list of guard band.

In various embodiments, the one or more UL RB sets and the one or more DL RB sets are indicated by one list of guard band if duplexing enhancement or subband non-overlap full duplex is enabled.

In various embodiments, the symbol is a DL, flexible, or UL symbol.

In various embodiments, duplexing enhancement or subband non-overlap full duplex is enabled for the symbol.

In various embodiments, the one or more DL RB sets do not overlap with the one or more UL RB sets.

In various embodiments, the one or more DL RB sets indicate frequency resource(s) used for DL and/or the one or more UL RB sets indicate frequency resource(s) used for UL.

In various embodiments, the UL transmission is scheduled by a DCI or configured by higher layer.

Referring back to FIGS. 3 and 4, in one or more embodiments from the perspective of a UE, the device 300 includes a program code 312 stored in memory 310 of the transmitter. The CPU 308 could execute program code 312 to: (i) operate in unpaired spectrum; (ii) be configured with one or more DL RB sets and one or more UL RB sets on a symbol; (iii) perform an UL transmission on the symbol if a frequency resource of the UL transmission is within the one or more UL RB sets; and (iv) cancel the UL transmission on the symbol if the frequency resource of the UL transmission is not within the one or more UL RB sets. Moreover, the CPU 308 can execute the program code 312 to perform all of the described actions, steps, and methods described above, below, or otherwise herein.

Figure 10:
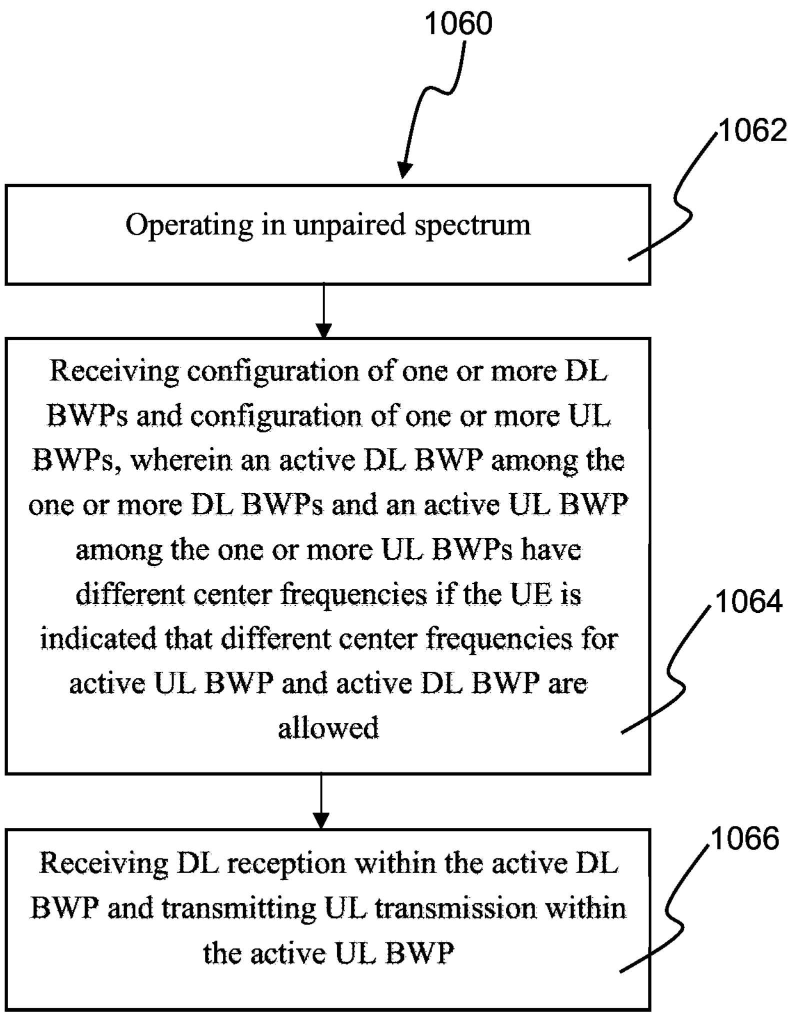
FIG. 10 is a flow diagram of a UE operating in unpaired spectrum, receiving configuration of one or more DL BWPs and configuration of one or more UL BWPs, and receiving DL reception within the active DL BWP and transmitting UL transmission within the active UL BWP, in accordance with embodiments of the present invention.

Referring to FIG. 10, with this and other concepts, systems, and methods of the present invention, a method 1060 for a UE in a wireless communication system comprises operating in unpaired spectrum (step 1062), receiving configuration of one or more DL BWPs and configuration of one or more UL BWPs, wherein an active DL BWP among the one or more DL BWPs and an active UL BWP among the one or more UL BWPs have different center frequencies if the UE is indicated that different center frequencies for active UL BWP and active DL BWP are allowed (step 1064), and receiving DL reception within the active DL BWP and transmitting UL transmission within the active UL BWP (step 1066).

For the embodiments, examples, and concepts detailed above and herein, the following aspects and embodiments are possible.

In various embodiments, the UE does not expect center frequency of the active DL BWP and center frequency of the active UL BWP to be different if the UE is not indicated that different center frequencies for active UL BWP and active DL BWP are allowed.

In various embodiments, the active DL BWP and the active UL BWP have different BWP ids if the UE is indicated that active UL BWP and active DL BWP could have different center frequencies.

In various embodiments, the UE is indicated that different center frequencies for active UL BWP and active DL BWP are allowed if duplexing enhancement or subband non-overlap full duplex is enabled.

In various embodiments, the UE is not indicated that different center frequencies for active UL BWP and active DL BWP are allowed if duplexing enhancement or subband non-overlap full duplex is not enabled.

Referring back to FIGS. 3 and 4, in one or more embodiments from the perspective of a UE, the device 300 includes a program code 312 stored in memory 310 of the transmitter. The CPU 308 could execute program code 312 to: (i) operate in unpaired spectrum; (ii) receive configuration of one or more DL BWPs and configuration of one or more UL BWPs, wherein an active DL BWP among the one or more DL BWPs and an active UL BWP among the one or more UL BWPs have different center frequencies if the UE is indicated that different center frequencies for active UL BWP and active DL BWP are allowed; and (iii) receive DL reception within the active DL BWP and transmitting UL transmission within the active UL BWP. Moreover, the CPU 308 can execute the program code 312 to perform all of the described actions, steps, and methods described above, below, or otherwise herein.

Figure 11:
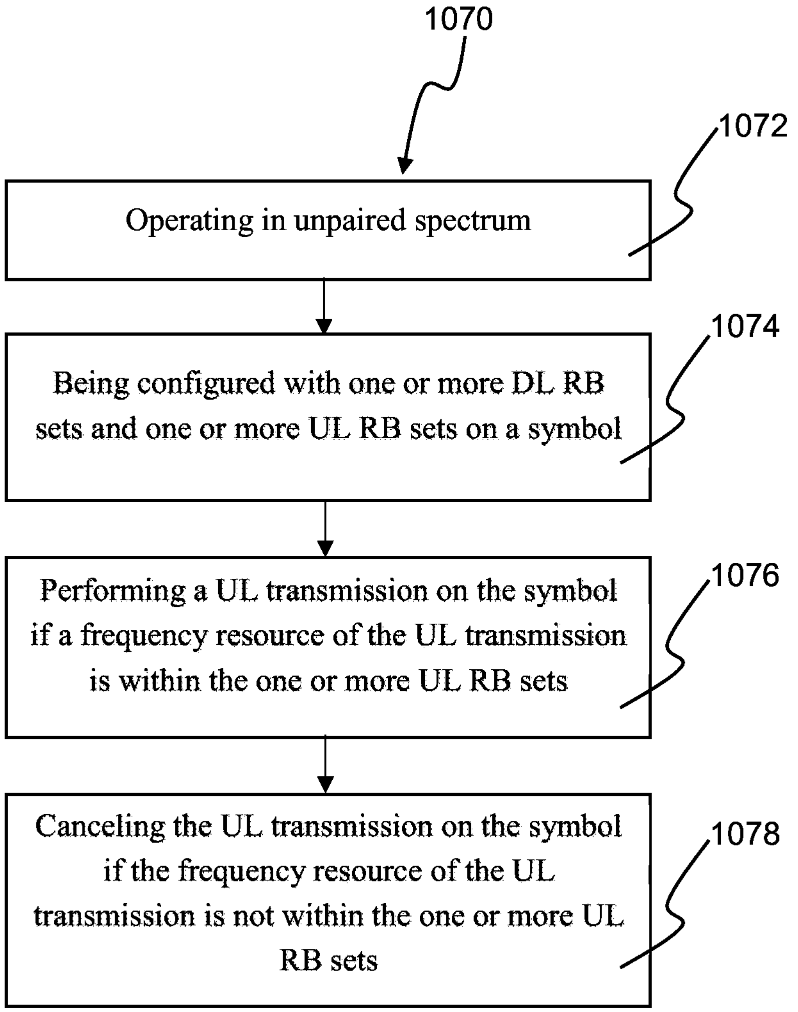
FIG. 11 is a flow diagram of a UE operating in unpaired spectrum, being configured with one or more DL RB sets and one or more UL RB sets on a symbol, performing an UL transmission on the symbol, and canceling the UL transmission on the symbol, in accordance with embodiments of the present invention.

Referring to FIG. 11, with this and other concepts, systems, and methods of the present invention, a method 1070 for a UE in a wireless communication system comprises operating in unpaired spectrum (step 1072), being configured with one or more DL RB sets and one or more UL RB sets on a symbol (step 1074), performing an UL transmission on the symbol if a frequency resource of the UL transmission is within the one or more UL RB sets (step 1076), and canceling the UL transmission on the symbol if the frequency resource of the UL transmission is not within the one or more UL RB sets (step 1078).

For the embodiments, examples, and concepts detailed above and herein, the following aspects and embodiments are possible.

In various embodiments, the method further comprises performing a DL reception if the frequency resource of the DL reception is within the one or more DL RB sets, and/or canceling a DL reception if the frequency resource of the DL reception is not within the one or more DL RB sets.

In various embodiments, the method further comprises canceling the UL transmission on the symbol if the frequency resource of the UL transmission is within the one or more DL RB sets.

In various embodiments, the one or more UL RB sets and the one or more DL RB sets are indicated by one list of guard band.

In various embodiments, the one or more UL RB sets and the one or more DL RB sets are indicated by one list of guard band if duplexing enhancement or subband non-overlap full duplex is enabled.

In various embodiments, the symbol is a DL, a flexible, or an UL symbol.

In various embodiments, the duplexing enhancement or subband non-overlap full duplex is enabled for the symbol.

In various embodiments, the one or more DL RB sets do not overlap with the one or more UL RB sets.

In various embodiments, the one or more DL RB sets indicates one or more frequency resources used for DL and/or the one or more UL RB sets indicate one or more frequency resources used for UL.

In various embodiments, the UL transmission is scheduled by a Downlink Control Information (DCI) or configured by higher layer.

Referring back to FIGS. 3 and 4, in one or more embodiments from the perspective of a UE, the device 300 includes a program code 312 stored in memory 310 of the transmitter. The CPU 308 could execute program code 312 to: (i) operate in unpaired spectrum; (ii) be configured with one or more DL RB sets and one or more UL RB sets on a symbol; (iii) perform an UL transmission on the symbol if a frequency resource of the UL transmission is within the one or more UL RB sets; and (iv) cancel the UL transmission on the symbol if the frequency resource of the UL transmission is not within the one or more UL RB sets. Moreover, the CPU 308 can execute the program code 312 to perform all of the described actions, steps, and methods described above, below, or otherwise herein.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a User Equipment (UE), comprising:

operating in unpaired spectrum;

receiving, from a base station, configuration of one or more Downlink (DL) Bandwidth Parts (BWPs) and configuration of one or more Uplink (UL) BWPs, indicating the one or more DL BWPs and the one or more UL BWPs are not linked, wherein an active DL BWP among the one or more DL BWPs and an active UL BWP among the one or more UL BWPs have different center frequencies if the UE is indicated that different center frequencies for active UL BWP and active DL BWP are allowed; and receiving DL reception within the active DL BWP and transmitting UL transmission within the active UL BWP.

2. The method of claim 1, wherein the UE does not expect center frequency of the active DL BWP and center frequency of the active UL BWP to be different if the UE is not indicated that different center frequencies for active UL BWP and active DL BWP are allowed.

3. The method of claim 1, wherein the active DL BWP and the active UL BWP have different BWP ids if the UE is indicated that active UL BWP and active DL BWP could have different center frequencies.

4. The method of claim 1, wherein the UE is indicated that different center frequencies for active UL BWP and active DL BWP are allowed if duplexing enhancement or subband non-overlap full duplex is enabled.

5. The method of claim 1, wherein the UE is not indicated that different center frequencies for active UL BWP and active DL BWP are allowed if duplexing enhancement or subband non-overlap full duplex is not enabled.

6. A User Equipment (UE), comprising:

a memory; and a processor operatively coupled to the memory, wherein the processor is configured to execute program code to:

operate in unpaired spectrum;

receive, from a base station, configuration of one or more Downlink (DL) Bandwidth Parts (BWPs) and configuration of one or more Uplink (UL) BWPs, indicating the one or more DL BWPs and the one or more UL BWPs are not linked, wherein an active DL BWP among the one or more DL BWPs and an active UL BWP among the one or more UL BWPs have different center frequencies if the UE is indicated that different center frequencies for active UL BWP and active DL BWP are allowed; and receive DL reception within the active DL BWP and transmitting UL transmission within the active UL BWP.

7. The UE of claim 6, wherein the UE does not expect center frequency of the active DL BWP and center frequency of the active UL BWP to be different if the UE is not indicated that different center frequencies for active UL BWP and active DL BWP are allowed.

8. The UE of claim 6, wherein the active DL BWP and the active UL BWP have different BWP ids if the UE is indicated that active UL BWP and active DL BWP could have different center frequencies.

9. The UE of claim 6, wherein the UE is indicated that different center frequencies for active UL BWP and active DL BWP are allowed if duplexing enhancement or subband non-overlap full duplex is enabled.

10. The UE of claim 6, wherein the UE is not indicated that different center frequencies for active UL BWP and active DL BWP are allowed if duplexing enhancement or subband non-overlap full duplex is not enabled.

* * * * *